United States Patent
Badr

(10) Patent No.: US 12,001,443 B2
(45) Date of Patent: Jun. 4, 2024

(54) AUTHORITATIVE FACTUAL SERVICE FOR BLOCKCHAIN SMART CONTRACTS

(71) Applicant: Google LLC, Mountain View, CA (US)

(72) Inventor: Ibrahim Badr, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/077,482

(22) Filed: Dec. 8, 2022

(65) Prior Publication Data

US 2024/0054141 A1   Feb. 15, 2024

Related U.S. Application Data

(60) Provisional application No. 63/396,723, filed on Aug. 10, 2022.

(51) Int. Cl.
*G06F 16/248* (2019.01)
*G06F 16/2455* (2019.01)

(52) U.S. Cl.
CPC ........ *G06F 16/248* (2019.01); *G06F 16/2455* (2019.01)

(58) Field of Classification Search
CPC .......................... G06F 16/248; G06F 16/2455
See application file for complete search history.

(56) References Cited

U.S. PATENT DOCUMENTS

| | | | | |
|---|---|---|---|---|
| 10,831,452 | B1 * | 11/2020 | Hunter | G06N 5/01 |
| 11,393,024 | B1 * | 7/2022 | Kodihalli | G06Q 40/03 |
| 2020/0374105 | A1 | 11/2020 | Padmanabhan | |
| 2021/0073285 | A1 * | 3/2021 | Hunter | H04L 9/3263 |
| 2021/0073287 | A1 * | 3/2021 | Hunter | H04L 63/123 |
| 2022/0094543 | A1 | 3/2022 | Sekar et al. | |
| 2022/0198562 | A1 | 6/2022 | Cella et al. | |

* cited by examiner

*Primary Examiner* — Angelica Ruiz
(74) *Attorney, Agent, or Firm* — DORITY & MANNING P.A.

(57) ABSTRACT

Systems and methods for trigger event determination can include processing blockchain data to determine a trigger event. Data associated with the trigger event can be processed to determine a query. The query can then be utilized to recursively search a database for data descriptive of the trigger event occurring. A notification can then be provided to instruct a resulting action to be performed.

20 Claims, 12 Drawing Sheets

AUTHORITATIVE FACTUAL SERVICE FOR BLOCKCHAIN SMART CONTRACTS

RELATED APPLICATIONS

This application claims priority to and the benefit of U.S. Provisional Patent Application No. 63/396,723, filed Aug. 10, 2022. U.S. Provisional Patent Application No. 63/396,723 is hereby incorporated by reference in its entirety.

FIELD

The present disclosure relates generally to providing an authoritative factual service for blockchain smart contracts. More particularly, the present disclosure relates to obtaining blockchain data, determining a trigger event for a smart contract based on the blockchain data, determining the trigger event has occurred, and providing instructions to perform the resulting action based on the trigger event determination.

BACKGROUND

Blockchains can include smart contracts that can be contingent upon particular occurrences. A reliable and authoritative source of facts may be needed for the operation of these smart contracts. Authoritative sources can be limited and/or may lack trustworthiness. Additionally, smart contracts may be directed to a plurality of different trigger events associated with a plurality of different topics.

SUMMARY

Aspects and advantages of embodiments of the present disclosure will be set forth in part in the following description, or can be learned from the description, or can be learned through practice of the embodiments.

One example aspect of the present disclosure is directed to a computing system for trigger event determination. The system can include one or more processors and one or more non-transitory computer-readable media that collectively store instructions that, when executed by the one or more processors, cause the computing system to perform operations. The operations can include obtaining blockchain data from a blockchain. The blockchain data can be descriptive of a smart contract. In some implementations, the smart contract can be associated with a trigger event and a resulting action. The operations can include processing the blockchain data to determine the trigger event. The trigger event can be associated with one or more particular knowledge graphs of a plurality of knowledge graphs. The operations can include generating a query based on the trigger event. The query can be associated with one or more particular knowledge graphs. The operations can include determining the trigger event has occurred based on the query. The operations can include transmitting a notification to a blockchain computing system. In some implementations, the blockchain computing system can be associated with the blockchain. The notification can be descriptive of the trigger event occurring. The notification can instruct the blockchain computing system to cause the resulting action to occur.

Another example aspect of the present disclosure is directed to a computer-implemented method for trigger event determination. The method can include obtaining, by a computing system including one or more processors, blockchain data from a blockchain. The blockchain data can be descriptive of a smart contract. In some implementations, the smart contract can be associated with a trigger event and a resulting action. The method can include processing, by the computing system, the blockchain data to determine the trigger event. The method can include generating, by the computing system, a query based on the trigger event. The method can include recursively searching, by the computing system, a knowledge database with the query. The method can include determining, by the computing system, the trigger event has occurred based on the query and the knowledge database. The method can include transmitting, by the computing system, a notification to a blockchain computing system. In some implementations, the blockchain computing system can be associated with the blockchain. The notification can be descriptive of the trigger event occurring. The notification can instruct the blockchain computing system to cause the resulting action to occur.

Another example aspect of the present disclosure is directed to one or more non-transitory computer-readable media that collectively store instructions that, when executed by one or more computing devices, cause the one or more computing devices to perform operations. The operations can include obtaining blockchain data from a blockchain. The blockchain data can be descriptive of a smart contract. In some implementations, the smart contract can be associated with a trigger event and a resulting action. The operations can include processing the blockchain data to determine the trigger event. The trigger event can be associated with one or more entities. The operations can include generating a query based on the trigger event. In some implementations, the query can be associated with the one or more entities. The operations can include determining the trigger event has occurred based on recursively querying a search engine with the query. The operations can include transmitting a notification to a blockchain computing system. The blockchain computing system can be associated with the blockchain. In some implementations, the notification can be descriptive of the trigger event occurring. The notification can instruct the blockchain computing system to cause the resulting action to occur.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
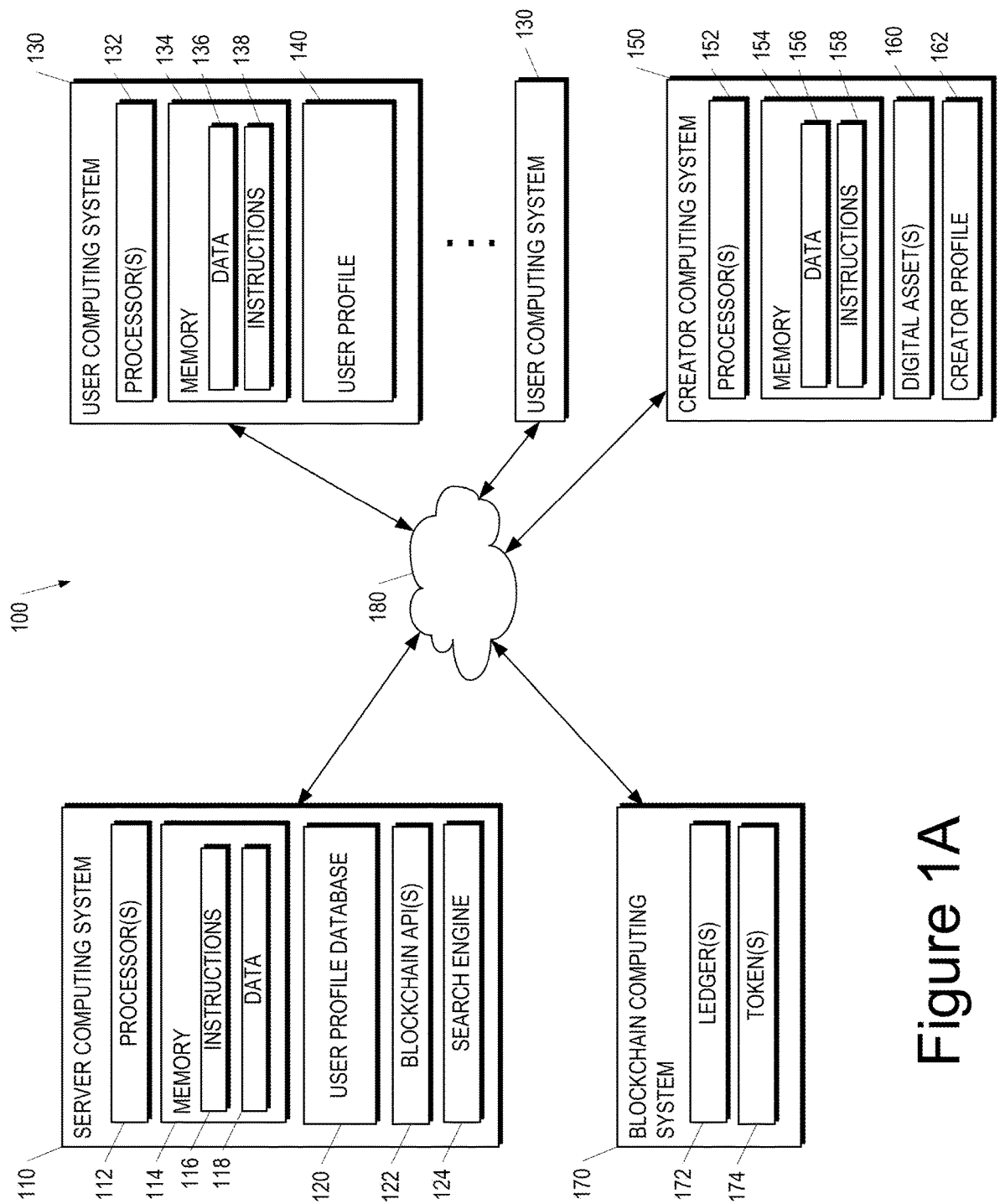
FIG. 1A depicts a block diagram of an example computing system that performs trigger event determination according to example embodiments of the present disclosure.

Reference numerals that are repeated across plural figures are intended to identify the same features in various implementations.

DETAILED DESCRIPTION

Overview

Generally, the present disclosure is directed to systems and methods for smart contract trigger event determination. In particular, the systems and methods disclosed herein can leverage query generation and recursive searching to determine a trigger event has occurred. The systems and methods disclosed herein can utilize a knowledge database, a search engine, and/or a plurality of knowledge graphs to determine a trigger event of a smart contract has occurred and/or is occurring. For example, a search system can be utilized to enable an oracle system for blockchain smart contracts such that the search system can search for information on one or more factors associated with a trigger event of a smart contract. In some implementations, the search system can provide preference to particular sources (e.g., the search system may weight the search results based on a determined trustworthiness of the source). The systems and methods may process word definitions, web answers, geo data, live feeds of movies, and/or live feeds of sports events to determine the trigger event has occurred.

For example, the systems and methods can include obtaining blockchain data from a blockchain. The blockchain data can be descriptive of a smart contract. The smart contract can be associated with a trigger event and a resulting action. The blockchain data can be processed to determine the trigger event. The trigger event can be associated with one or more particular knowledge graphs of a plurality of knowledge graphs. The systems and methods can include generating a query based on the trigger event. In some implementations, the query can be associated with one or more particular knowledge graphs. The systems and methods can determine the trigger event has occurred based on the query. A notification can be transmitted to a blockchain computing system. The blockchain computing system can be associated with the blockchain. In some implementations, the notification can be descriptive of the trigger event occurring. The notification can instruct the blockchain computing system to cause the resulting action to occur.

The systems and methods can obtain blockchain data from a blockchain. The blockchain data can be descriptive of a smart contract. In some implementations, the blockchain data can be obtained via a blockchain node. The smart contract can be associated with a trigger event and a resulting action. In some implementations, the resulting action can include providing a payload to a particular user. The payload can include a non-fungible token (e.g., a non-fungible token associated with a digital resource) and/or cryptocurrency. The resulting action may include implementing an application programming interface to perform a particular interaction (e.g., an update action, a transaction action, and/or message interaction). The trigger event may include a particular outcome of a sports event (e.g., a particular team winning, a particular player stat line, a particular play, and/or a particular point total). Alternatively and/or additionally, the trigger event may include a particular weather event occurring (e.g., rain occurring, a temperature high, a temperature low, a storm occurrence, and/or type of precipitation). In some implementations, the trigger event can include a particular location-based event occurring (e.g., a traffic event, a population event, a voting result event, an employment event, law passing event, and/or a local social event). The trigger event may include a query threshold being met. For example, the threshold may be a total volume of queries, a total volume of queries in a given time period, a location-based time volume, and/or a particular user query volume.

The blockchain data can be processed to determine the trigger event. The trigger event can be associated with one or more particular knowledge graphs (e.g., a knowledge graph associated with one or more entities (e.g., objects, people, events, tasks, situations, and/or concepts)) of a plurality of knowledge graphs. In some implementations, the one or more particular knowledge graphs can include a sports knowledge graph associated with a particular sport. The sports event may be associated with the particular sport. Alternatively and/or additionally, the one or more particular knowledge graphs can include a weather knowledge graph associated with a particular weather type. The one or more particular knowledge graphs can include a location knowledge graph associated with a particular location. Determining the trigger event can include identifying a subset of the blockchain data associated with a smart contract. The subset of the blockchain data associated with the smart contract can be processed to identify the trigger event data and the resulting action data. The trigger event data can then be processed by one or more machine-learned models to determine a semantic intent of the trigger event data. The trigger event may be an if clause associated with a smart contract. The resulting action can be a then clause associated with the smart contract. The structure of the data may be utilized to determine the trigger event data.

A query can be generated based on the trigger event. The query can be associated with one or more particular knowledge graphs. The query can include one or more terms associated with the one or more particular knowledge graphs. Additionally and/or alternatively, the query can include one or more terms associated with the semantic intent of the trigger event. The query can include text data, image data, latent encoding data, audio data, and/or video data. The query may be generated based on a deterministic function and/or based on heuristics. Alternatively and/or additionally, the query may be generated with one or more machine-learned models. The one or more machine-learned models can include a natural language processing model (e.g., a large pre-trained language model), a segmentation model, an augmentation model, an image processing model, an audio processing model, a video processing model, and/or a latent encoding processing model. In some implementations, the query generation can include determining one or more labels associated with a trigger event and utilizing the one or more labels.

The systems and methods can determine the trigger event has occurred based on the query. In some implementations, the query can be provided to a search engine recursively at a predetermined interval. Alternatively and/or additionally, the interval may be machine-learned and/or may fluctuate based on one or more variables. In some implementations, the query may be utilized to search a database. The database can be determined based on the knowledge graph, may be pre-associated with the trigger event, may be determined based on the determined semantic intent, and/or may be a database of an authoritative source associated with a particular topic.

In some implementations, determining the trigger event has occurred based on the query can include providing the query to a search engine, obtaining search result data from the search engine, and determining the trigger event has occurred based on the search result data. The search result data may be processed to determine the search result data is descriptive of a particular outcome. The particular outcome can be processed to determine that the particular outcome is the trigger event. In some implementations, the search result data can be processed to determine a confidence level of the particular outcome determination. The search result data can be descriptive of information obtained from a plurality of sources. The respective information for particular sources may be weighted differently based on relevance to the topic, ranking of the search results, and/or based on a determined trustworthiness of the source.

Alternatively and/or additionally, determining the trigger event has occurred based on the query can include determining a trending topic is associated with the query and determining the trending topic is descriptive of the trigger event occurring. The trending topic can be associated with a disaster topic (e.g., a hurricane or wildfire), a media content item topic (e.g., a movie, a song, an album, an image, and/or a GIF), a stock topic, a sports team topic, and/or a particular entity topic.

A notification can be transmitted to a blockchain computing system. The notification may be generated based on the trigger event being determined. The blockchain computing system can be associated with the blockchain. In some implementations, the notification can be descriptive of the trigger event occurring. The notification may instruct the blockchain computing system to cause the resulting action to occur. In some implementations, the notification can be transmitted to the blockchain computing system via an application programming interface. The notification can be associated with one or more keys for validating the oracle system with the blockchain. The notification can include one or more lines of executable code, proof of work, a hash function, and/or evidence data.

In some implementations, the systems and methods can include encoding data associated with the trigger event occurrence to the blockchain. For example, one or more pointers can be embedded in the blockchain. The one or more pointers can direct a user to evidence of the trigger event occurrence (e.g., a uniform resource locator address for the authoritative source).

The query may be utilized to recursively search the knowledge database to determine the trigger event has occurred. The systems and methods can include obtaining blockchain data from a blockchain. The blockchain data can be descriptive of a smart contract. The smart contract can be associated with a trigger event and a resulting action. The blockchain data can be processed to determine the trigger event. A query can be generated based on the trigger event. The systems and methods can include recursively searching a knowledge database with the query. The trigger event can be determined to have occurred based on the query and the knowledge database. The systems and methods can include transmitting a notification to a blockchain computing system. The blockchain computing system can be associated with the blockchain. The notification can be descriptive of the trigger event occurring. In some implementations, the notification can instruct the blockchain computing system to cause the resulting action to occur.

The systems and methods can obtain blockchain data from a blockchain. The blockchain data can be descriptive of a smart contract. In some implementations, the smart contract can be associated with a trigger event and a resulting action. The smart contract can include causing the resulting action to be performed in response to the trigger event being determined to occur. The smart contract can be descriptive of an if-then function. The if clause can be the trigger event, and the resulting action can be the then clause. The trigger event can include an outcome of an event. The resulting action can include a transfer of a digital resource and/or cryptocurrency. In some implementations, the resulting action can include causing an application programming interface to interact with a particular web platform. Alternatively and/or additionally, the resulting action can include generating an additional smart contract and embedding the smart contract to the blockchain.

The blockchain data can be processed to determine the trigger event. Determining the trigger event can include determining the subset of the blockchain data includes data associated with a smart contract. The determination may be based on one or more standards and/or one or more protocols for smart contracts. In some implementations, the determination may be based on a data structure. Additionally and/or alternatively, the blockchain data can be decrypted, processed to generate a plain English translation of the data, and the plain English translation can be processed by a natural language processing model to identify the trigger event.

A query can be generated based on the trigger event. The query can be generated based on identifying one or more key words in a decrypted trigger event. The one or more keywords can then be utilized in the query. In some implementations, one or more labels can be determined based on the one or more key words, and the one or more labels can be utilized to generate the query.

The systems and methods can recursively search a knowledge database with the query. The recursive searching can occur at equal intervals, fluctuating intervals, and/or at a hybrid set of intervals such that equal intervals may be complemented by an additional search instance. The knowledge database can be associated with one or more sources. The one or more sources can be topic-specific authoritative sources and may have varying levels of authority.

In some implementations, the systems and methods can determine the trigger event is associated with a particular topic. The knowledge database can include data associated with a particular topic. The knowledge database can be determined based on the one or more particular knowledge graphs associated with the trigger event.

Additionally and/or alternatively, recursively searching the knowledge database with the query can generate a plurality of search result datasets. Each search result dataset may be associated with a different respective instance of a search. In some implementations, the systems and methods can determine the trigger event has occurred based on one or more search result datasets of the plurality of search result datasets.

The trigger event can then be determined to have occurred based on the query and the knowledge database. The determination can include obtaining search result data associated with the recursive searching of the knowledge database. The search result data can be processed to determine if the search result data is descriptive of the trigger event occurring.

A notification can be transmitted to a blockchain computing system. The blockchain computing system can be associated with the blockchain. In some implementations, the notification can be descriptive of the trigger event occurring. The notification can instruct the blockchain computing system to cause the resulting action to occur.

Additionally and/or alternatively, the query may be generated based on an entity associated with the trigger event. For example, the systems and methods can obtain blockchain data from a blockchain. The blockchain data can be descriptive of a smart contract. In some implementations, the smart contract can be associated with a trigger event and a resulting action. The systems and methods can process the blockchain data to determine the trigger event. The trigger event can be associated with one or more entities. A query can be generated based on the trigger event. The query can be associated with the one or more entities. The trigger event can be determined to have occurred based on recursively querying a search engine with the query. In some implementations, the systems and methods can transmit a notification to a blockchain computing system. The blockchain computing system can be associated with the blockchain. In some implementations, the notification can be descriptive of the trigger event occurring. The notification may instruct the blockchain computing system to cause the resulting action to occur.

Blockchain data can be obtained from a blockchain. The blockchain data can be descriptive of a smart contract. In some implementations, the smart contract can be associated with a trigger event and a resulting action. The trigger event can include a particular blockchain action. The particular blockchain action can be associated with a particular user and a particular blockchain transaction. In some implementations, the resulting action can include transferring a digital resource to a particular user. The trigger event can include a transaction action associated with a particular non-fungible token. The resulting action can include a transaction action associated with a different non-fungible token.

The systems and methods can process the blockchain data to determine the trigger event. The trigger event can be associated with one or more entities. In some implementations, the one or more entities can include a sports team, a performer, a politician, an athlete, and/or a production company. The one or more entities may be determined by processing the blockchain data.

A query can be generated based on the trigger event. The query can be associated with the one or more entities. The query may include one or more descriptors associated with the one or more entities. The query may include Boolean terms and/or one or more words associated with a particular event type.

In some implementations, generating the query can include processing the blockchain data with a machine-learned language model to determine a semantic intent (e.g., the meaning of the trigger event can be associated with an outcome of a sports event, a type of weather event, and/or a blockchain transaction) of the trigger event and generating the query based on the semantic intent.

The systems and methods can determine the trigger event has occurred based on recursively querying a search engine with the query. The search engine can be a general search engine, a topic specific search engine, a scholarly article search engine, an image search engine, and/or authoritative source search engine (e.g., a search engine that identifies authoritative sources and their respective content). The search engine may leverage one or more knowledge graphs.

The systems and methods can transmit a notification to a blockchain computing system. The blockchain computing system can be associated with the blockchain. The notification can be descriptive of the trigger event occurring. In some implementations, the notification can instruct the blockchain computing system to cause the resulting action to occur.

The systems and methods can be utilized as an oracle for smart contracts (e.g., a trigger event can be determined, which can then cause a resulting action to be performed). For example, the trigger event can be a disaster event determined based on geo data, which can be utilized to instruct a notification to be provided to a plurality of users. Alternatively and/or additionally, the trigger event can include a sports outcome associated with a sports bet input by a user, which can be determined by querying a sports database and/or based on a live stream or feed. In some implementations, the trigger event can be associated with a weather event, which can be determined based on data obtained from a trusted weather resource to trigger a weather bet payout. The trigger event may be associated with a query threshold being met. In some implementations, the trigger event may be associated with a particular topic trending.

In some implementations, the systems and methods disclosed herein can utilize world triggers and/or one or more application programming interfaces associated with one or more world triggers. The systems and methods may leverage knowledge graph mapping to determine the trigger event has occurred. The trigger event determination can include checking multiple websites via a web crawl. The checks may be deterministic based on a predetermined interval search to a particular web resource. Alternatively and/or additionally, the check may occur based on one or more machine-learned parameters.

The sources of the data may be determined based on reliability of a source based on a high confidence score. In some implementations, the source may be specialized information obtained by a search engine, a browser application, a virtual assistant application, a social media platform, and/or a platform as a service.

In some implementations, the systems and methods can include storing advertisement data on a blockchain. The advertisement data can include text data, image data, video data, latent encoding data, and/or audio data. The advertisement data can include the content item being utilized for the advertisement. Additionally and/or alternatively, the advertisement data can include parameters for providing the advertisement, the data associated with the advertiser, and/or metadata for the advertisement. The systems and methods may determine an impression has occurred and may store data descriptive of the impression to the blockchain. The impressions may be embedded in the blockchain. The impressions can then be utilized to determine if a trigger event of a smart contract has been met.

The systems and methods of the present disclosure provide a number of technical effects and benefits. As one example, the system and methods can provide systems and methods for providing an authoritative factual service for blockchain smart contracts. For example, the systems and methods disclosed herein can leverage a plurality of knowledge graphs and/or a search engine to determine a trigger event has occurred in which the smart contract indicates a resulting action is to be performed in response to the trigger event occurring.

Another technical benefit of the systems and methods of the present disclosure is the ability to leverage a machine-learned model to generate a query based on a trigger event to recursively search for data associated with a trigger event. For example, the systems and methods disclosed herein can process blockchain data with a machine-learned model to determine a semantic intent of the trigger event. The semantic intent can then be utilized to generate a query associated with the trigger event. The query can then be utilized to recursively search for the occurrence of the trigger event.

Another example of technical effect and benefit relates to improved computational efficiency and improvements in the functioning of a computing system. For example, the systems and methods disclosed herein can leverage the search system to determine a trigger event has occurred without having to generate new databases.

With reference now to the Figures, example embodiments of the present disclosure will be discussed in further detail.

Example Devices and Systems

FIG. 1A depicts a block diagram of an example computing system 100 that performs trigger event determination according to example embodiments of the present disclosure. The system 100 includes a user computing system 130, a server computing system 110, a creator computing system 150, and a blockchain computing system 170 that are communicatively coupled over a network 180.

The user computing system 130 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the user computing system 130 to perform operations.

The user computing system 130 can also include one or more user input components that receive user input. For example, the user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 110 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 118 and instructions 116 which are executed by the processor 112 to cause the server computing system 110 to perform operations.

In some implementations, the server computing system 110 includes or is otherwise implemented by one or more server computing devices. In instances in which the server computing system 110 includes plural server computing devices, such server computing devices can operate according to sequential computing architectures, parallel computing architectures, or some combination thereof.

The blockchain computing system 170 includes one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store data and instructions which are executed by the processor to cause the blockchain computing system 170 to perform operations. In some implementations, the blockchain computing system 170 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The computing system 100 can include a number of applications (e.g., applications 1 through N). Each application can be in communication with a central intelligence layer. Example applications can include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can communicate with a central device data layer. The central device data layer can be a centralized repository of data for the computing system 100. In some implementations, the central device data layer can communicate with a number of other components of the computing device, such as, for example, one or more sensors, a context manager, a device state component, and/or additional components. In some implementations, the central device data layer can communicate with each device component using an API (e.g., a private API).

Additionally and/or alternatively, FIG. 1A depicts an exemplary computing system 100 that can be used to implement an authoritative factual service for blockchain smart contracts according to aspects of the present disclosure. The system 100 has a user-server architecture that includes a server 110 that communicates with one or more user computing systems 130 over a network 180. However, the present disclosure can be implemented using other suitable architectures, which can include any number of computing systems communicating over a network 180.

The system 100 includes a server 110, such as, for example, a web server. The server 110 can be one or more computing devices that are implemented as a parallel computing system and/or a distributed computing system. In particular, multiple computing devices can act together as a single server 110. The server 110 can have one or more processor(s) 112 and a memory 114. The server 110 can also include a network interface used to communicate with one or more remote computing devices (e.g., user devices) 130 over a network 180.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions 116 that can be executed by processor(s) 112. The instructions 116 can be any set of instructions that when executed by the processor(s) 112, cause the processor(s) 112 to provide desired functionality.

In particular, the instructions 116 can be executed by the processor(s) 112 to implement trigger event determination. The user profile database 120 can be configured to store a plurality of user profiles associated with a plurality of users utilizing one or more user computing systems 130. In some implementations, the user profile database 120 can be configured to be utilized for facilitating one or more interactions. The facilitation of the one or more interactions can involve the use of a blockchain application programming interface (API) 122 to send data to and receive data from a blockchain computing system 170. For example, a server computing system 110 can utilize the blockchain API 122 to update one or more ledgers 172 of the blockchain computing system 170. The one or more ledgers 172 can be associated with one or more tokens 174. The one or more tokens 174 can include one or more non-fungible tokens, which can include scripts associated with a digital asset (e.g., image data, video data, text data, latent encoding data, domain data, audio data, augmented-reality asset rendering data, and/or virtual-reality asset rendering data). In particular, the script can reference a specific digital asset that is provided for sale. The digital asset can include image data, text data, video data, latent encoding data, a domain name, a virtual property, an augmented-reality asset, a virtual-reality asset (e.g., a virtual-reality environment and/or a virtual-reality object for interaction in an environment), a smart contract, a physical item authentication, etc. In some implementations, the one or more ledgers 172 can be associated with cryptocurrency that can be utilized to make transactions in a physical marketplace and/or a virtual marketplace.

It will be appreciated that the term "element" can refer to computer logic utilized to provide desired functionality. Thus, any element, function, and/or instructions can be implemented in hardware, application specific circuits, firmware and/or software controlling a general purpose processor. In one implementation, the elements or functions are program code files stored on the storage device, loaded into memory and executed by a processor or can be provided from computer program products, for example computer executable instructions, that are stored in a tangible computer-readable storage medium such as RAM, hard disk or optical or magnetic media.

Memory 114 can also include data 118 that can be retrieved, manipulated, created, or stored by processor(s) 112. The data 118 can include search result data, ranking data, image data (e.g., digital maps, satellite images, aerial photographs, street-level photographs, synthetic models, paintings, personal images, portraits, etc.), video data, audio data, text data (e.g., books, articles, blogs, poems, etc.), latent encoding data, blockchain address data, tables, vector data (e.g., vector representations of roads, parcels, buildings, etc.), point of interest data (e.g., locales such as islands, cities, restaurants, hospitals, parks, hotels, and schools), or other data or related information. As an example, the data 118 can be used to access information and data associated with a specific digital asset, website, search result, blockchain, etc.

The data 118 can be stored in one or more databases. The one or more databases can be connected to the server 110 by a high bandwidth LAN or WAN, or can also be connected to server 110 through network 180. The one or more databases can be split up so that they are located in multiple locales.

The server 110 can exchange data with one or more user computing systems 130 over the network 180. Although two user computing systems 130 are illustrated in FIG. 1A, any number of user computing systems 130 can be connected to the server 110 over the network 180. The user computing systems 130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, the user computing system 130 can be multiple computing devices acting together to perform operations or computing actions.

Similar to server 110, a user computing system 130 can include a processor(s) 132 and a memory 134. The memory 134 can store information accessible by processor(s) 132, including instructions that can be executed by processor(s) and data. As an example, memory 134 can store data 136 and instructions 138.

Instructions 138 can provide instructions for implementing a browser, a non-fungible token purchase, and/or a plurality of other functions. In particular, the user of user computing system 130 can exchange data with server 110 by using the browser to visit a website accessible at a particular web-address. The trigger event determination of the present disclosure can be provided as an element of a user interface of a website and/or application.

The data 136 can include data related to running a specialized application on the user computing system 130. In particular, the specialized application can be used to exchange data with server 110 over the network 160. The data 136 can include user-device-readable code for providing and implementing aspects of the present disclosure. Additionally and/or alternatively, the data 136 can include data related to previously inputted or received data. For example, the data 136 can include data related to past occurrences of the special application.

The user computing system 130 can include various user input devices for receiving information from a user, such as a touch screen, touch pad, data entry keys, speakers, mouse, motion sensor, and/or a microphone suitable for voice recognition. Further, the user computing system 130 can have a display for presenting information, such as a user interface, displaying a digital asset, displaying pop-ups or application elements displayed in an interface, and/or other forms of information.

The user computing system 130 can also include a user profile 140 that can be used to identify a user of the user computing system 130. The user profile 140 can be optionally used by the user to make one or more transactions which can then be recorded on one or more ledgers 172 of the blockchain computing system 170. The user profile 140 can be descriptive of user information, which can include identification numbers and/or payment account information. For example, the user profile 140 can include data associated with a crypto wallet, which may be linked to a browser application via an application extension and/or embedding.

The user computing system 130 can further include a graphics processing unit. Graphics processing unit can be used by processor 132 to determine a trigger event associated with a blockchain smart contract has occurred. In some embodiments, the user computing system 130 performs any and all determination and/or generation processing.

The user computing system 130 can include a network interface for communicating with a server 110 over a network 180. Network interface can include any components or configuration suitable for communication with server 110 over network 180, including, for example, one or more ports, transmitters, wireless cards, controllers, physical layer components, or other items for communication according to any currently known or future developed communications protocol or technology.

The network 180 can be any type of communications network, such as a local area network (e.g., intranet), wide area network (e.g., Internet), or some combination thereof. The network 180 can also include a direct connection between a client device 130 and the server 110. In general, communication between the server 110 and a client device 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

In some implementations, the exemplary computing system 100 can include one or more creator computing systems 150. The one or more creator computing systems 150 can be utilized for generating images, videos, prose, poetry, audio, etc., which can then be provided for sale. The one or more creator computing systems 150 can include one or more processors 152, which can be utilized to execute one or more operations to implement the systems and methods disclosed herein. The one or more creator computing systems 150 can include one or more memory components 154, which can be utilized to store data 156 and one or more instructions 158. The data 156 can include data related to one or more applications, one or more media datasets, etc. The instructions 158 can include one or more operations for implementing the systems and methods disclosed herein.

The one or more creator computing systems 150 can store data associated with one or more digital assets 160 and/or one or more creator profiles 162. The one or more digital assets 160 can include text data, image data, video data, audio data, latent encoding data, domain data, or a variety of other data formats. The one or more creator profiles 162 can include information associated with one or more "creators" of the one or more digital assets 160. The one or more creator profiles 162 can include identification data, transaction data, and/or crypto wallet data.

Additionally and/or alternatively, the exemplary computing system 100 can include one or more blockchain computing systems 170. The one or more blockchain computing systems 170 can include a plurality of computing devices being utilized for decentralized data storage, such that a plurality of "blocks" can be distributed throughout a network of computing devices to provide a secure system for data storage, which can include one or more ledgers 172 and one or more tokens 174. In some implementations, each of the one or more tokens 174 can be associated with at least a portion of the one or more ledgers 172.

Blockchain can refer to a system configured to securely record information. The blockchain can include a decentralized system that can render changing information extremely difficult. The blockchain can include a digital ledger of transactions that can be duplicated and distributed across a network of computing systems. Each block in the chain can include a number of transactions. When a new transaction occurs on the blockchain, a record of that transaction can be added to every computing device's ledger. The blockchain can be utilized to track the exchange of currency and/or digital assets via the recording of transactions on the digital ledger, which can be propagated throughout the decentralized system. The currency exchanged and tracked via the blockchain computing system 170 can be referred to as cryptocurrency.

The tokens 174 can include one or more non-fungible tokens. The non-fungible tokens can be minted on a blockchain associated with the blockchain computing system 170. A non-fungible token (NFT) can be a certificate of authenticity of a digital asset. NFTs can be non-interchangeable thus making their worth depend on the price anyone may be willing to pay for the asset. NFTs can be minted on blockchains such that their scarcity and authenticity can be maintained. A digital asset can be defined as anything that is stored digitally and can be uniquely identifiable that organizations can use to realize value. Examples of digital assets can include a tweet, a social media comment, documents, audio, images, videos, logos, website domains, slide presentations, spreadsheets, CSS files and formats, executable code, and/or websites.

Figure 1B:
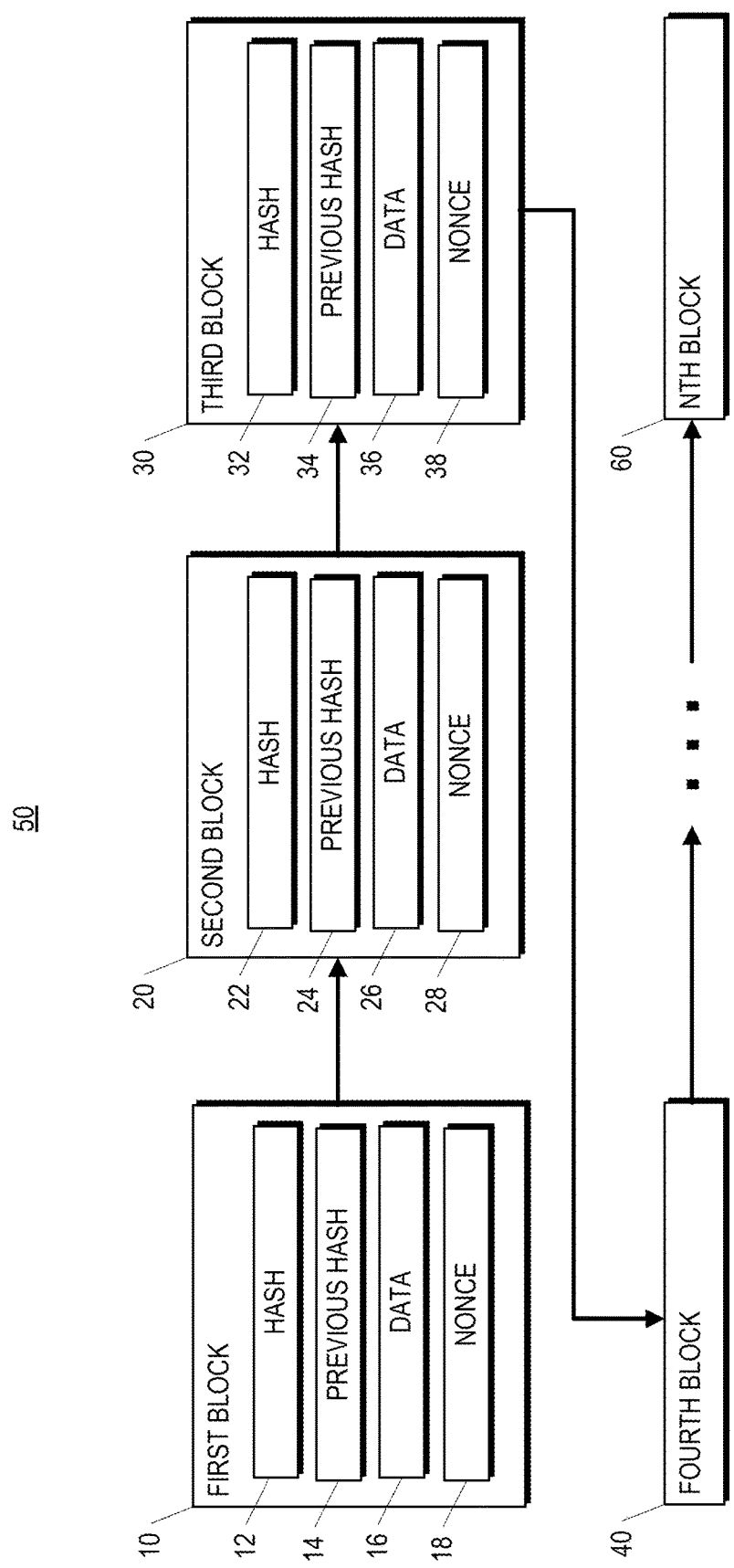
FIG. 1B depicts a block diagram of an example computing device that performs trigger event determination according to example embodiments of the present disclosure.

FIG. 1B depicts a block diagram of an example blockchain 50 that may be utilized by the blockchain computing system 170 of the exemplary computing system 100 of FIG. 1A. The example blockchain 50 can include a plurality of blocks that can be utilized to store data with one or more cryptographic features. The blockchain 50 can be stored on a decentralized computing system comprising a plurality of computing devices. The blockchain 50 can be a public blockchain (e.g., a blockchain that is open without access restrictions such that anyone with an internet access can send transactions or validate transactions as part of the decentralized, distributed system), a private blockchain (e.g., a blockchain that provides access based on permissions set by network administrators), or a hybrid blockchain (e.g., a blockchain with a combination of blocks with no restrictions and blocks with restrictions). The blockchain 50 can include proof of work features that can include one or more cryptographic forms of proof. The proof of work can be provided upon a request to update the blockchain 50 (e.g., a request to update the ledgers based on a new transaction).

The proof of work can convey that a certain device or group of devices have performed a certain amount of computation, which can then be validated by other parties. Once validated, the blockchain 50 can be updated, or may remain unchanged in response to a failure to validate. The proof of work feature can be utilized to mitigate the computational cost of every device in the system having to perform the same computational functions and checks for determining a request is valid for updating the blockchain 50.

Each block can include a hash, a previous hash associated with the hash of the previous block, and data. In some implementations, each block can include a nonce. A hash can be a hash value of a fixed length that can be a fingerprint for the particular block. The hash value can be generated based on a hash function and may be changed each time a change is made to the data of that particular block. The previous hash can include a hash value of the block immediately preceding the particular block. The previous hash can be utilized to ensure the downstream ground truth stays unchanged unless proper validation occurs. The data can include transaction data (e.g., a transaction ledger), a timestamp, a value associated with a cryptocurrency value, a non-fungible token (e.g., a non-fungible token including a script that references a digital asset, nonce data, and/or general blockchain data. Nonce (i.e., a number only used once) can be a number added to a block in a blockchain that can meet a difficulty level restriction when a block is rehashed. The nonce can be a number that blockchain miners are solving for, in order to receive an incentive (e.g., cryptocurrency).

The blockchain 50 can include one or more security protocols and/or features. The blockchain 50 can include a cryptographic system. For example, the blockchain 50 can validate the blockchain 50 is valid by ensuring the stored previous hash stored in the block matches the hash value of the previous block from the last block back to the first block (e.g., the genesis block). In some implementations, the blockchain 50 can include proof of work validation that can rely on verifying proof of computation before implementing a change to the stored data (e.g., the stored ledger). Proof of work validation can take seconds, minutes, and/or hours based in part on the number of blocks in the blockchain 50. Additionally and/or alternatively, the blockchain 50 can be implemented on a distributed, decentralized computing system. In some implementations, each computing device in the distributed, decentralized computing system can store a portion of (e.g., a block of the plurality of blocks) or all of the blocks in the blockchain 50. Therefore, the system can verify data by ensuring the data is uniform across most, if not all, of the distributed system. Each node of the distributed system can be checked for tampering before adding new data.

The data can include data associated with a cryptocurrency value (e.g., a ledger associated with a specific cryptocurrency value), data associated with a digital asset (e.g., a non-fungible token minted on the blockchain 50 that can include a script associated with the digital asset), data associated with a smart contract (e.g., a smart contract that includes conditions that automatically initiates an action in response to a criteria being met), and/or timestamp data (e.g., timestamp data for block creation, minting, a transaction, etc.).

In particular, FIG. 1B depicts a first block 10, a second block 20, a third block 30, a fourth block 40, and an nth block 60. Although five blocks are depicted, any number of blocks can be utilized. The first block 10 can be a genesis block (e.g., a first overall block in the blockchain). The first block 10 can include a respective first hash 12 (e.g., a hash value associated with the first block 10). The first block 10 may include a first previous hash 14 (e.g., if the first block 10 has a block before it in the blockchain 50, then the hash of the previous block can be stored on the first block 10). Additionally and/or alternatively, the first block 10 can include data 16 and nonce 18.

The second block 20 can follow the first block 10. The second block 20 can include a respective second hash 22 (e.g., a hash value associated with the second block 20). The second block 20 may include a second previous hash 24 (e.g., the second previous hash 24 can be the same as, or reference, the first hash 12). Additionally and/or alternatively, the second block 20 can include data 26 and nonce 28.

The third block 30 can follow the second block 20. The third block 30 can include a respective third hash 32 (e.g., a hash value associated with the third block 30). The third block 30 may include a third previous hash 34 (e.g., the third previous hash 34 can be the same as, or reference, the second hash 22). Additionally and/or alternatively, the third block 30 can include data 36 and nonce 38.

Additionally and/or alternatively, the fourth block 40, the nth block 60, and other potential blocks can include a respective hash, a respective previous hash, and data. The first data 16, the second data 26, the third data 36, and the data of the other blocks can include overlapping data, can differ, and/or be the same such that the data is duplicative for all blocks. In some implementations, each block can be associated with a different transaction (e.g., a different minting, a different sale, etc.). The first nonce 18, the second nonce 28, the third nonce 38, and the nonce's of the other blocks can differ and may be solved during mining.

The data in each block can include ledger data, which can include a timestamp, asset and/or cryptocurrency exchanged, actors involved in transaction, and/or a variety of other information.

In some implementations, a plurality of different blockchains can be utilized for the systems and methods disclosed herein. The different blockchains can include different configurations. The different blockchains can include parallel chains, side chains, shared blocks, differing chains, varying permissions, varying purposes, varying number of blocks, and/or varying hash functions and/or varying hashing value lengths.

In some implementations, the systems and methods can include one or more machine-learned model computing systems 900. The one or more machine-learned models can be utilized for a variety of tasks for enabling token data identification, obtainment, indexing, and deduplication.

Figure 9A:
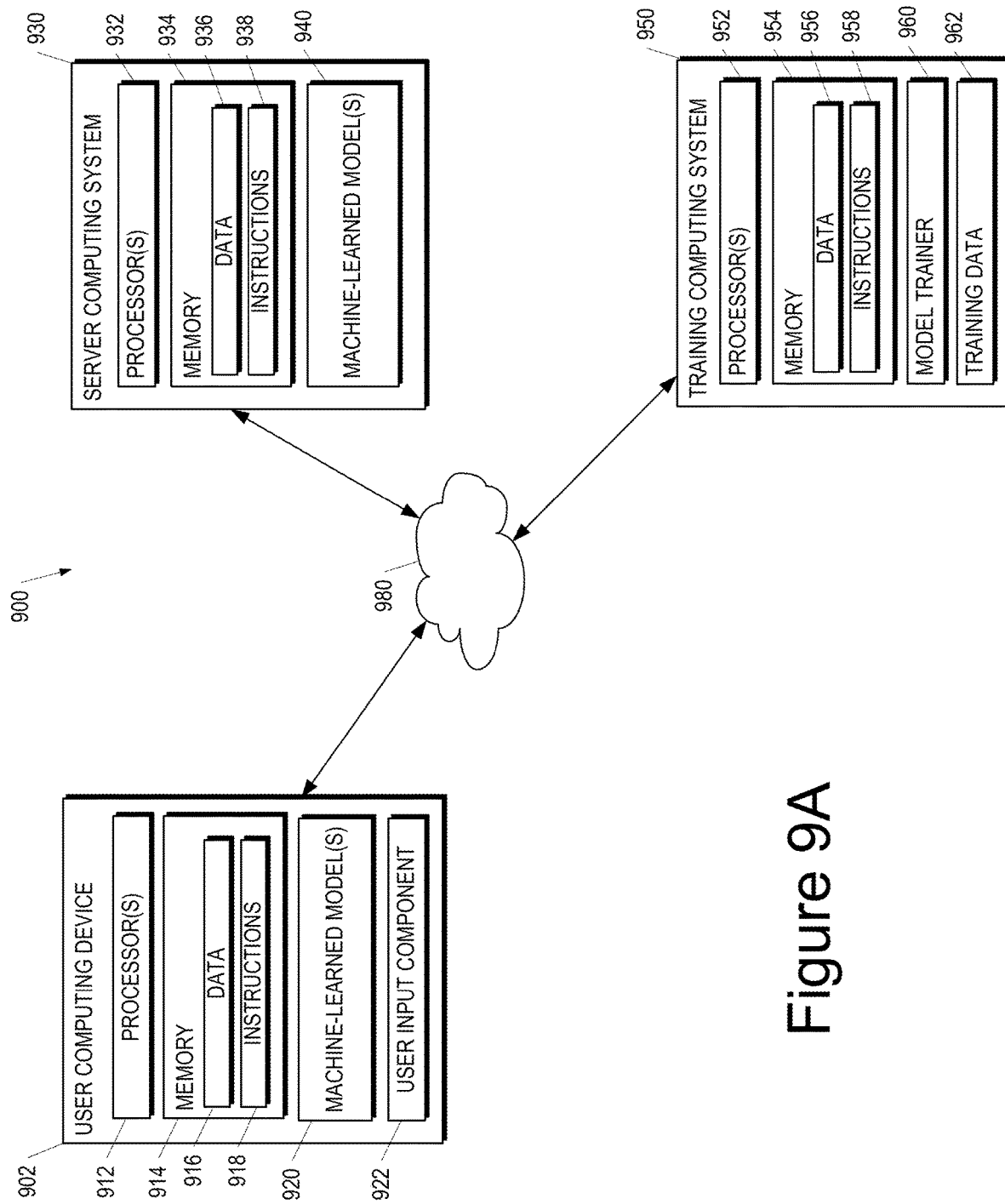
FIG. 9A depicts a block diagram of an example computing system that performs trigger event determination according to example embodiments of the present disclosure.

FIG. 9A depicts a block diagram of an example computing system 900 that performs trigger event determination according to example embodiments of the present disclosure. The system 900 includes a user computing device 902, a server computing system 930, and a training computing system 950 that are communicatively coupled over a network 980.

The user computing device 902 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 916 and instructions 918 which are executed by the processor 912 to cause the user computing device 902 to perform operations.

In some implementations, the user computing device 902 can store or include one or more trigger event determination models 920. For example, the trigger event determination models 920 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example trigger event determination models 920 are discussed with reference to FIGS. 2-5.

In some implementations, the one or more trigger event determination models 920 can be received from the server computing system 930 over network 980, stored in the user computing device memory 914, and then used or otherwise implemented by the one or more processors 912. In some implementations, the user computing device 902 can implement multiple parallel instances of a single trigger event determination model 920 (e.g., to perform parallel trigger event determination across multiple instances of a trigger event for a smart blockchain smart contract).

More particularly, the computing system 900 can obtain blockchain data from a blockchain via a blockchain node. The blockchain data may be accessed based on one or more particular keys associated with the server computing system 930. The blockchain data can be processed by the one or more trigger event determination models 940 to determine a semantic intent, to determine key words, to determine the trigger event, and/or to generate a query. The semantic intent, the key words, the query, and/or the plain English translation of the trigger event may be utilized to query one or more databases for data associated with a trigger event occurring.

Additionally or alternatively, one or more trigger event determination models 940 can be included in or otherwise stored and implemented by the server computing system 930 that communicates with the user computing device 902 according to a client-server relationship. For example, the trigger event determination models 940 can be implemented by the server computing system 940 as a portion of a web service (e.g., an authoritative factual service). Thus, one or more models 920 can be stored and implemented at the user computing device 902 and/or one or more models 940 can be stored and implemented at the server computing system 930.

The user computing device 902 can also include one or more user input components 922 that receives user input. For example, the user input component 922 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations.

In some implementations, the server computing system 930 includes or is otherwise implemented by one or more server computing devices. In instances in which the server computing system 930 includes plural server computing devices, such server computing devices can operate according to sequential computing architectures, parallel computing architectures, or some combination thereof.

As described above, the server computing system 930 can store or otherwise include one or more machine-learned trigger event determination models 940. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 940 are discussed with reference to FIGS. 2-5.

The user computing device 902 and/or the server computing system 930 can train the models 920 and/or 940 via interaction with the training computing system 950 that is communicatively coupled over the network 980. The training computing system 950 can be separate from the server computing system 930 or can be a portion of the server computing system 930.

The training computing system 950 includes one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage mediums, such as RAM, ROM, EEPROM, EPROM, flash memory devices, magnetic disks, etc., and combinations thereof. The memory 954 can store data 956 and instructions 958 which are executed by the processor 952 to cause the training computing system 950 to perform operations. In some implementations, the training computing system 950 includes or is otherwise implemented by one or more server computing devices.

The training computing system 950 can include a model trainer 960 that trains the machine-learned models 920 and/or 940 stored at the user computing device 902 and/or the server computing system 930 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 960 can perform a number of generalization techniques (e.g., weight decays, dropouts, etc.) to improve the generalization capability of the models being trained.

In particular, the model trainer 960 can train the trigger event determination models 920 and/or 940 based on a set of training data 962. The training data 962 can include, for example, labeled training datasets, ground truth training data, blockchain data, semantic intent labels, trigger event labels, smart contract labeled examples, and/or query generation training datasets.

In some implementations, if the user has provided consent, the training examples can be provided by the user computing device 902. Thus, in such implementations, the model 920 provided to the user computing device 902 can be trained by the training computing system 950 on user-specific data received from the user computing device 902. In some instances, this process can be referred to as personalizing the model.

The model trainer 960 includes computer logic utilized to provide desired functionality. The model trainer 960 can be implemented in hardware, firmware, and/or software controlling a general purpose processor. For example, in some implementations, the model trainer 960 includes program files stored on a storage device, loaded into a memory and executed by one or more processors. In other implementations, the model trainer 960 includes one or more sets of computer-executable instructions that are stored in a tangible computer-readable storage medium such as RAM hard disk or optical or magnetic media.

The network 980 can be any type of communications network, such as a local area network (e.g., intranet), wide area network (e.g., Internet), or some combination thereof and can include any number of wired or wireless links. In general, communication over the network 980 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 9A illustrates one example computing system that can be used to implement the present disclosure. Other computing systems can be used as well. For example, in some implementations, the user computing device 902 can include the model trainer 960 and the training dataset 962. In such implementations, the models 920 can be both trained and used locally at the user computing device 902. In some of such implementations, the user computing device 902 can implement the model trainer 960 to personalize the models 920 based on user-specific data.

Figure 9B:
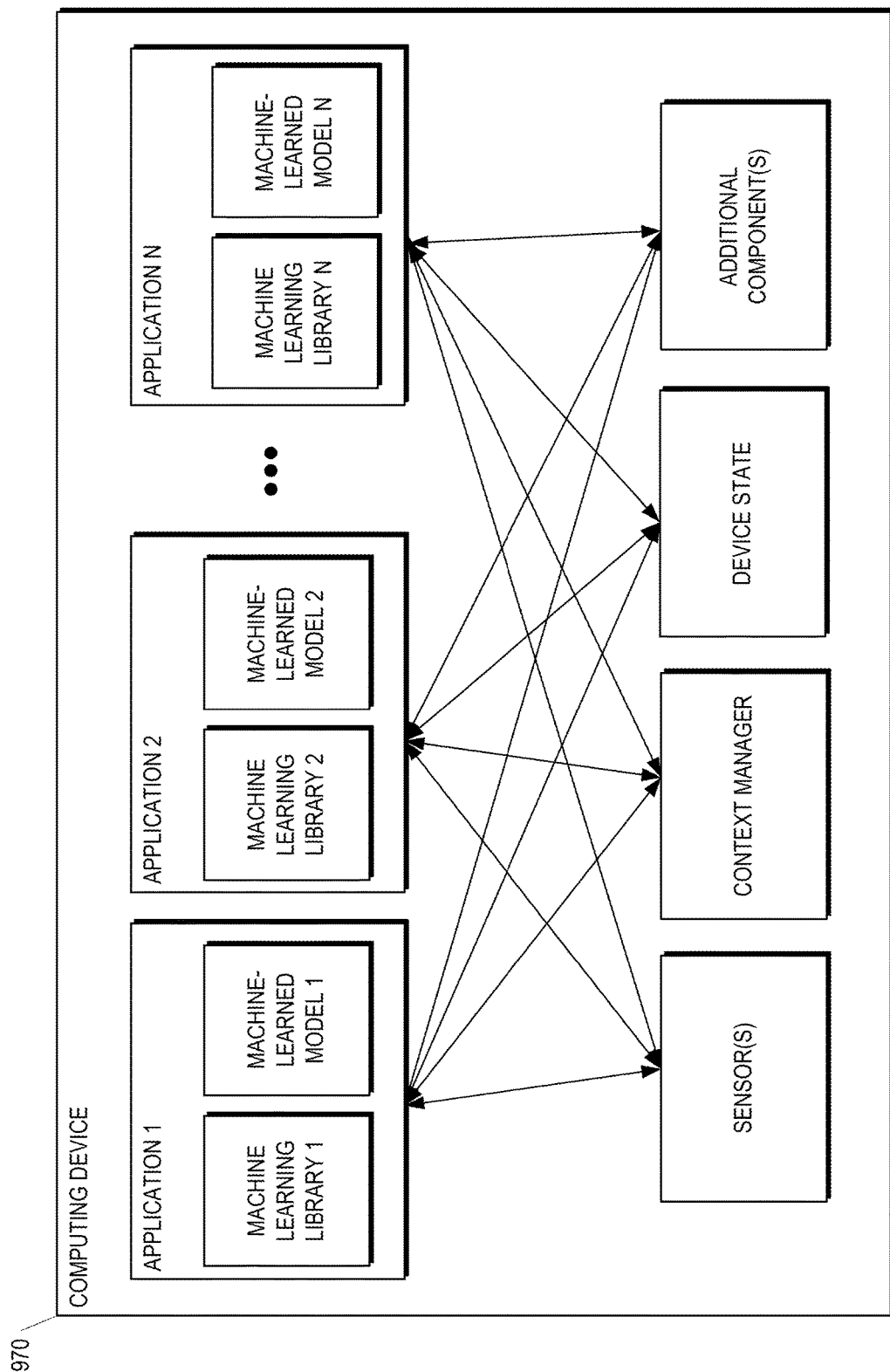
FIG. 9B depicts a block diagram of an example computing device that performs trigger event determination according to example embodiments of the present disclosure.

FIG. 9B depicts a block diagram of an example computing device 970 that performs according to example embodiments of the present disclosure. The computing device 970 can be a user computing device or a server computing device.

The computing device 970 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 9B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 9C:
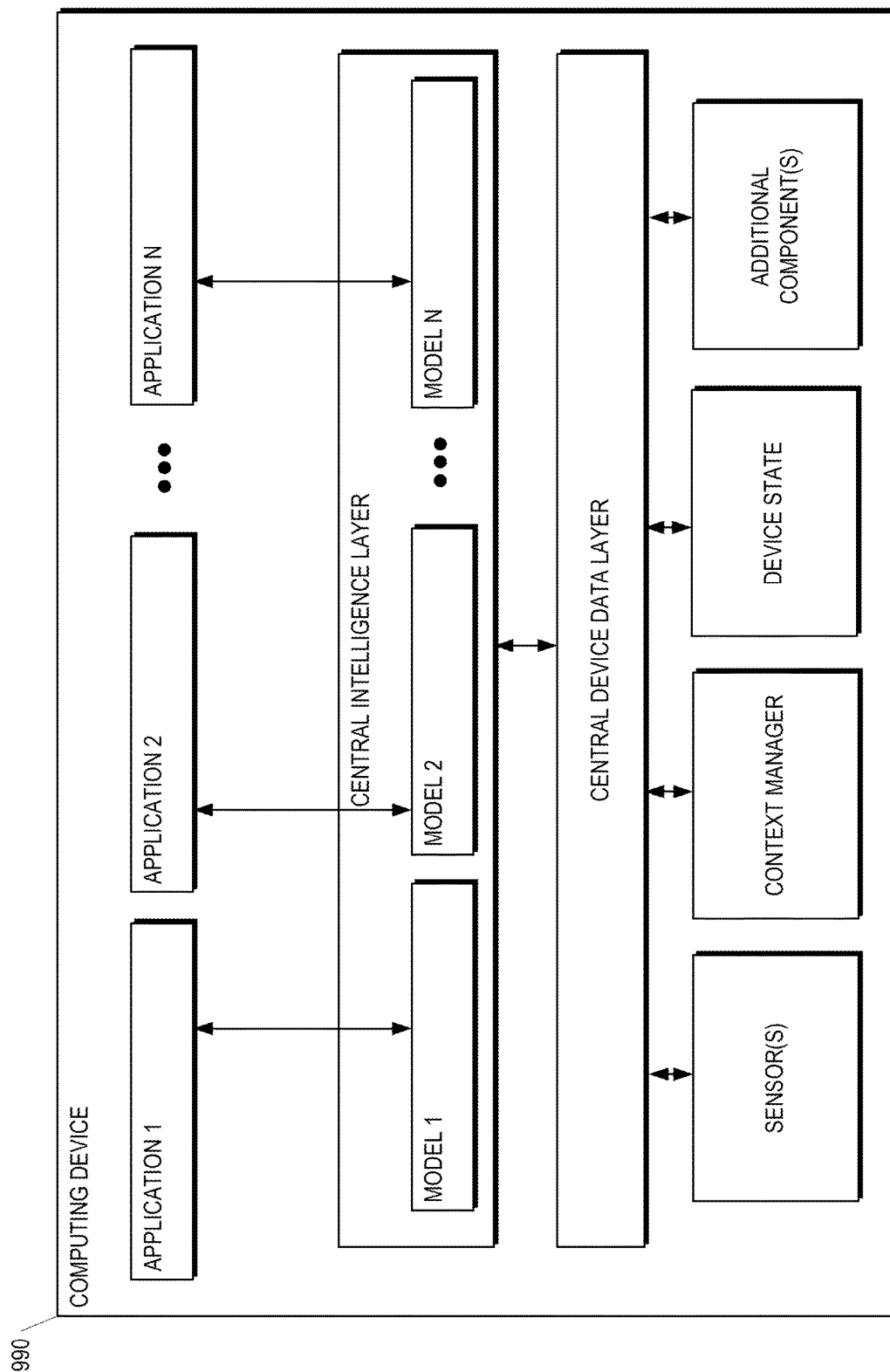
FIG. 9C depicts a block diagram of an example computing system that performs trigger event determination according to example embodiments of the present disclosure.

FIG. 9C depicts a block diagram of an example computing device 990 that performs according to example embodiments of the present disclosure. The computing device 990 can be a user computing device or a server computing device.

The computing device 990 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 9C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 990.

The central intelligence layer can communicate with a central device data layer. The central device data layer can be a centralized repository of data for the computing device 990. As illustrated in FIG. 9C, the central device data layer can communicate with a number of other components of the computing device, such as, for example, one or more sensors, a context manager, a device state component, and/or additional components. In some implementations, the central device data layer can communicate with each device component using an API (e.g., a private API).

Example System Arrangements

Figure 2:
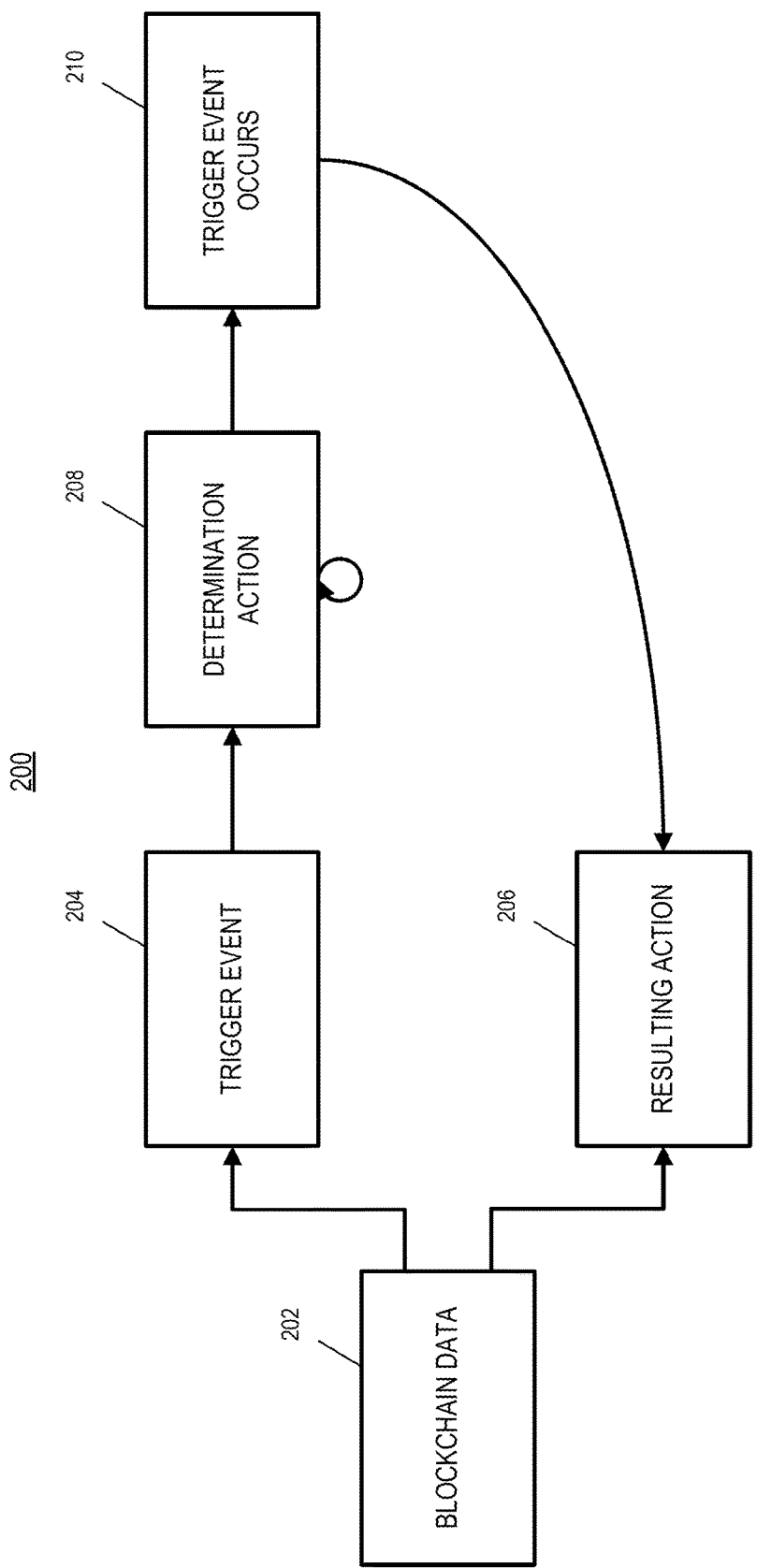
FIG. 2 depicts a block diagram of an example trigger event determination system according to example embodiments of the present disclosure.

FIG. 2 depicts a block diagram of an example trigger event determination system 200 according to example embodiments of the present disclosure. In some implementations, the trigger event determination system 200 is trained to receive a set of blockchain data 202 descriptive of a smart contract and, as a result of receipt of the blockchain data 202, determine a trigger event has occurred 210, which can then cause data to be sent to a blockchain computing system to perform a resulting action 206. Thus, in some implementations, the trigger event determination system 200 can include a determination action block 202 that is operable to check the status of the trigger event 204 at one or more intervals.

In particular, blockchain data 202 can be obtained from a blockchain and/or obtained from a repository or blockchain log. The blockchain data can be processed to identify a subset of data descriptive of a smart contract. A trigger event 204 and/or a resulting action 206 can be determined. The identification of the subset of data and/or the determination of the trigger event 204 may be performed by one or more machine-learned models.

The trigger event 204 can then be processed to determine and/or generate a determination action 208. The determination action 208 can include generating a query based on the trigger event and querying a database based on the query. Alternatively and/or additionally, the determination action 208 can continually process an RSS feed, a video feed, a social media feed, and/or an audio feed. The determination action 208 can be performed recursively until the trigger event occurs 210. When the trigger event determination system 200 determines the trigger event occurred 210, data associated with the determination can be transmitted to the blockchain computing system, which can cause the resulting action 206 to be performed.

Figure 3:
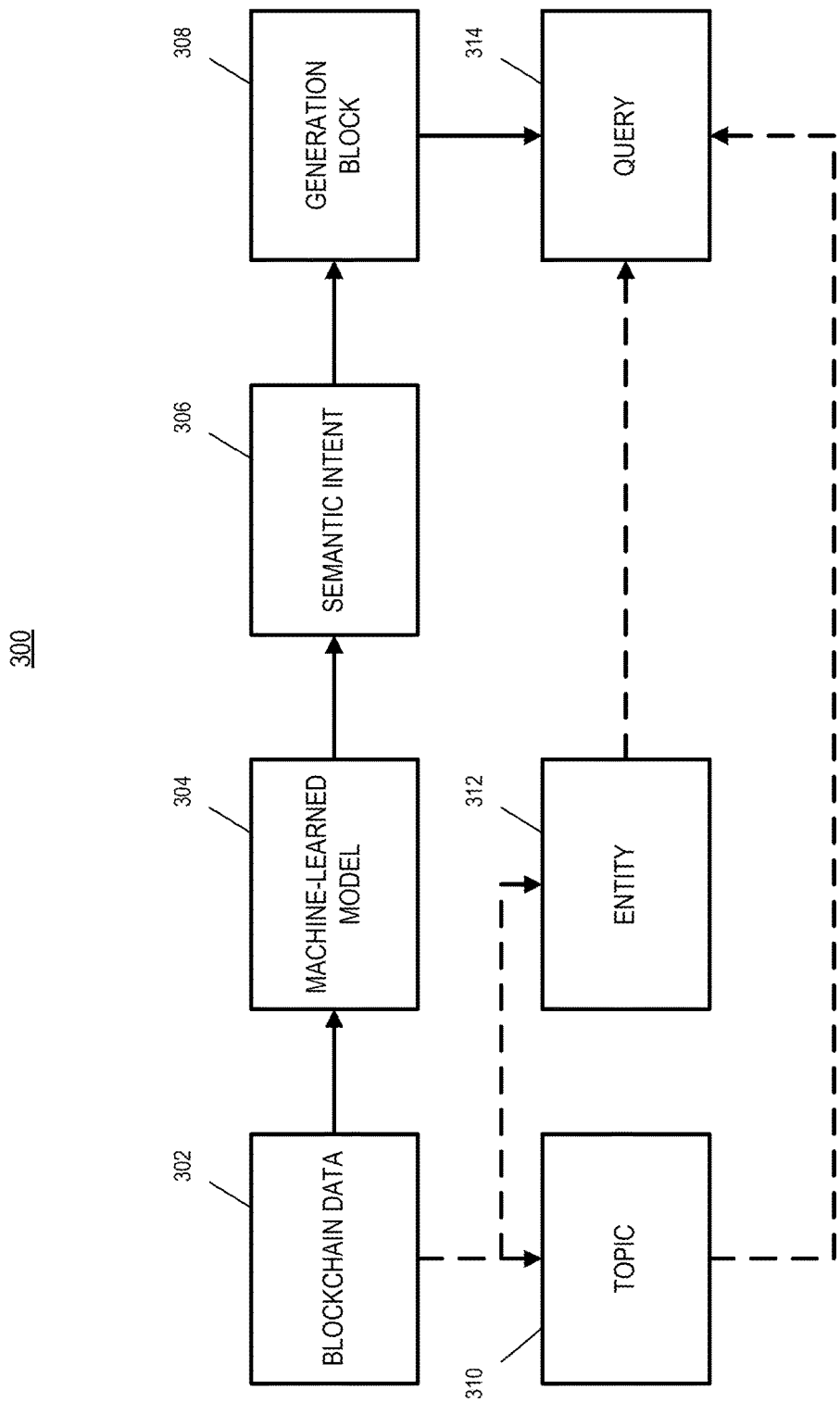
FIG. 3 depicts a block diagram of an example query generation system according to example embodiments of the present disclosure.

FIG. 3 depicts a block diagram of an example query generation system 300 according to example embodiments of the present disclosure. In particular, the query generation system 300 can include obtaining blockchain data 302. The blockchain data 302 can be processed with one or more machine-learned models 304 (e.g., a natural language processing model, a detection model, a determination model, a classification model, a segmentation model, an augmentation model, an image processing model, a latent encoding model, a decoder model, an encoder model, a self-attention model, and/or a decryption model) to determine a semantic intent 306. The semantic intent 306 can be descriptive of an outcome associated with the trigger event.

The semantic intent 306 can then be processed by a generation block 308 to generate a query 314. The generation block 308 can generate the query based on heuristics and/or based on one or more learned parameters. The query 314 may be generated based on one or more knowledge graphs.

In some implementations, the blockchain data 302 can be processed to determine a topic 310 associated with the trigger event. Alternatively and/or additionally, the blockchain data 302 can be processed to determine one or more entities 312 associated with the trigger event. The one or more topics 310 and/or the one or more entities 312 may be utilized to generate and/or to augment the query 314. In some implementations, the one or more topics 310 and/or the one or more entities 312 may be utilized to determine a particular database to search within using the query 314.

Figure 4:
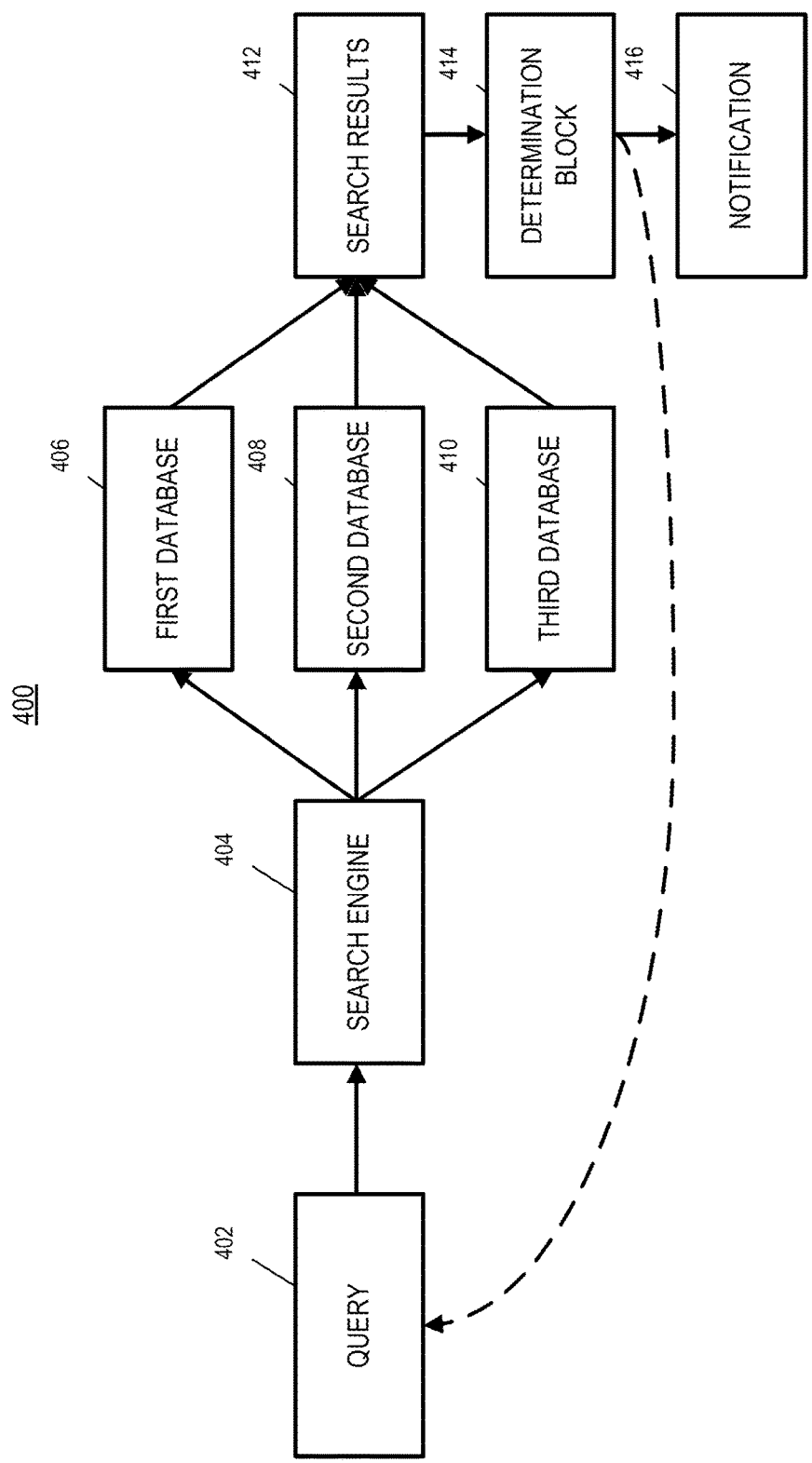
FIG. 4 depicts a block diagram of an example trigger event determination system according to example embodiments of the present disclosure.

FIG. 4 depicts a block diagram of an example trigger event determination system 400 according to example embodiments of the present disclosure. In particular, the trigger event determination system 400 can include obtaining and/or determining a query 402 based on a determined trigger event. The query 402 can then be provided to a search engine 404, which can search one or more databases. The one or more databases can include a first database 406, a second database 408, and/or a third database 410. Each database may be associated with one or more respective sources. The different respective resources may have varying levels of authority. The first database 406 can be associated with a government entity, the second database 408 can be associated with a private entity, and the third entity 410 can be associated with a general database. Utilizing a search engine 404 to search the one or more databases can cause one or more search results 412 to be generated. The search results 412 can be processed by a determination block to determine if the trigger event has occurred. The determination block 414 can include one or more machine-earned models. The determination block 414 can process the search results 412 to determine a particular outcome has occurred, and the determination block 414 can determine if the particular outcome is associated with the trigger event. One or more search results associated with the first database 406 may be weighted differently than one or more search results associated with the second database 408. A confidence level may be output by the determination block 414.

The determination block 414 may generate a notification 416 to transmit to a blockchain computing system in response to the trigger event occurring. Alternatively and/or additionally, the determination block 414 can cause the determination loop to be repeated in response to the data being descriptive of the trigger event not occurring. The notification can include instructions to perform a resulting action.

Figure 5:
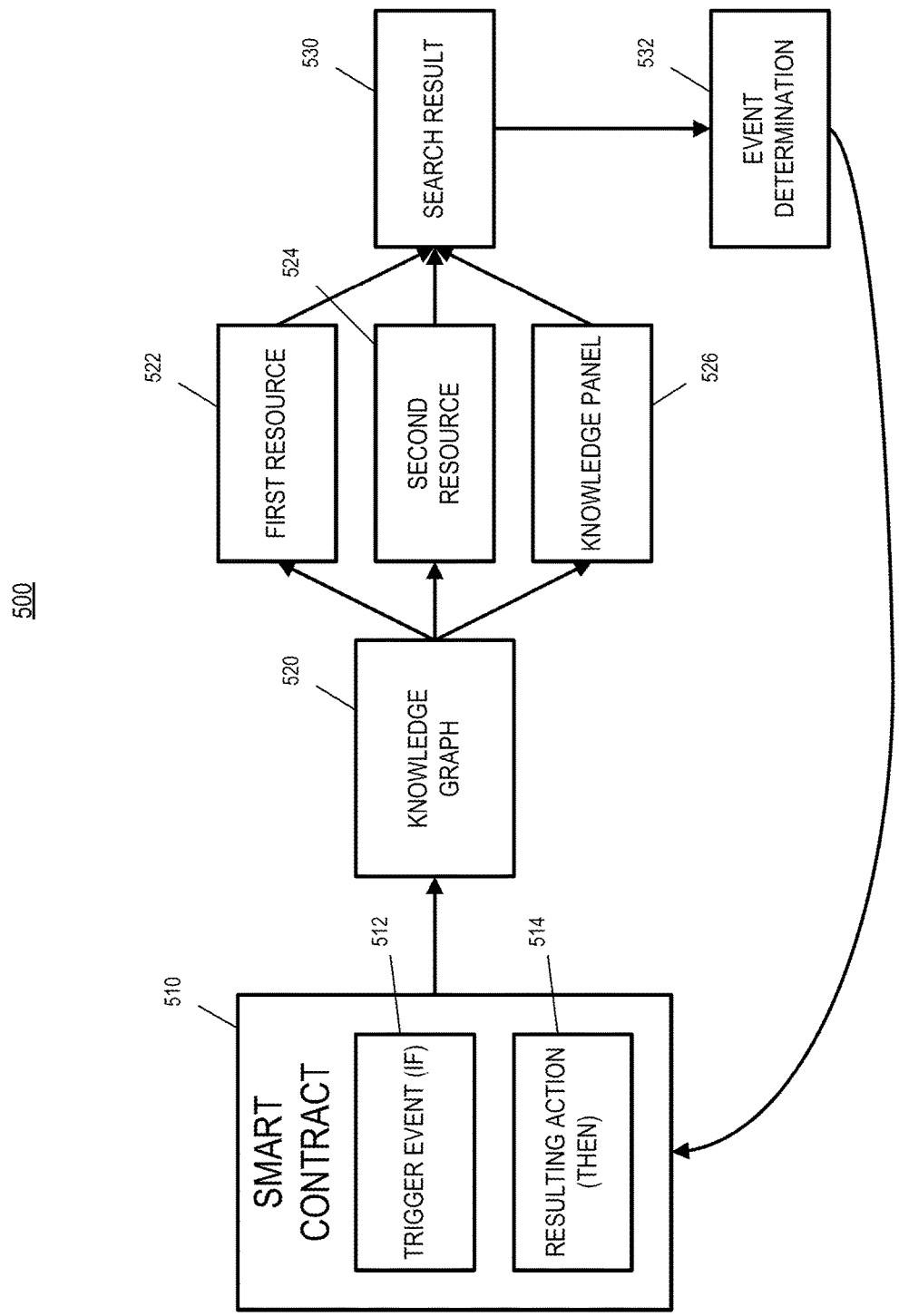
FIG. 5 depicts a block diagram of an example smart contract oracle system according to example embodiments of the present disclosure.

FIG. 5 depicts a block diagram of an example smart contract oracle system 500 according to example embodiments of the present disclosure. In particular, the smart contract oracle system 500 can include obtaining data associated with a smart contract 510. The data associated with the smart contract 510 can be processed to determine a trigger event 512 and a resulting action 514 associated with the smart contract 510. One or more knowledge graphs 520 can be utilized to determine whether a trigger event has occurred. In some implementations, the one or more knowledge graphs 520 can be utilized to determine one or more resources associated with the subject matter of a trigger event 512. For example, a trigger event 512 can include a sports outcome for a particular team. The one or more knowledge graphs 520 can include determining and/or identifying a first resource 522, a second resource 524, and/or a knowledge panel 526 associated with the trigger event 512. The first resource 522 can be a sports resource associated with an authority in the particular sport. The second resource 524 can be a team-specific sports website (e.g., a team-specific blog, the official team website, and/or a local news source for the team). The knowledge panel 526 can be a knowledge panel associated with a particular sport, the particular team, and/or sports outcomes for the specific day.

The first resource 522, the second resource 524, and/or the knowledge panel 526 can be utilized to generate search result data 530. The search result data 530 can be processed to generate an event determination 532. The event determination 532 can be descriptive of whether the trigger event has occurred. The determination loop can be repeated iteratively.

Example Methods

Figure 6:
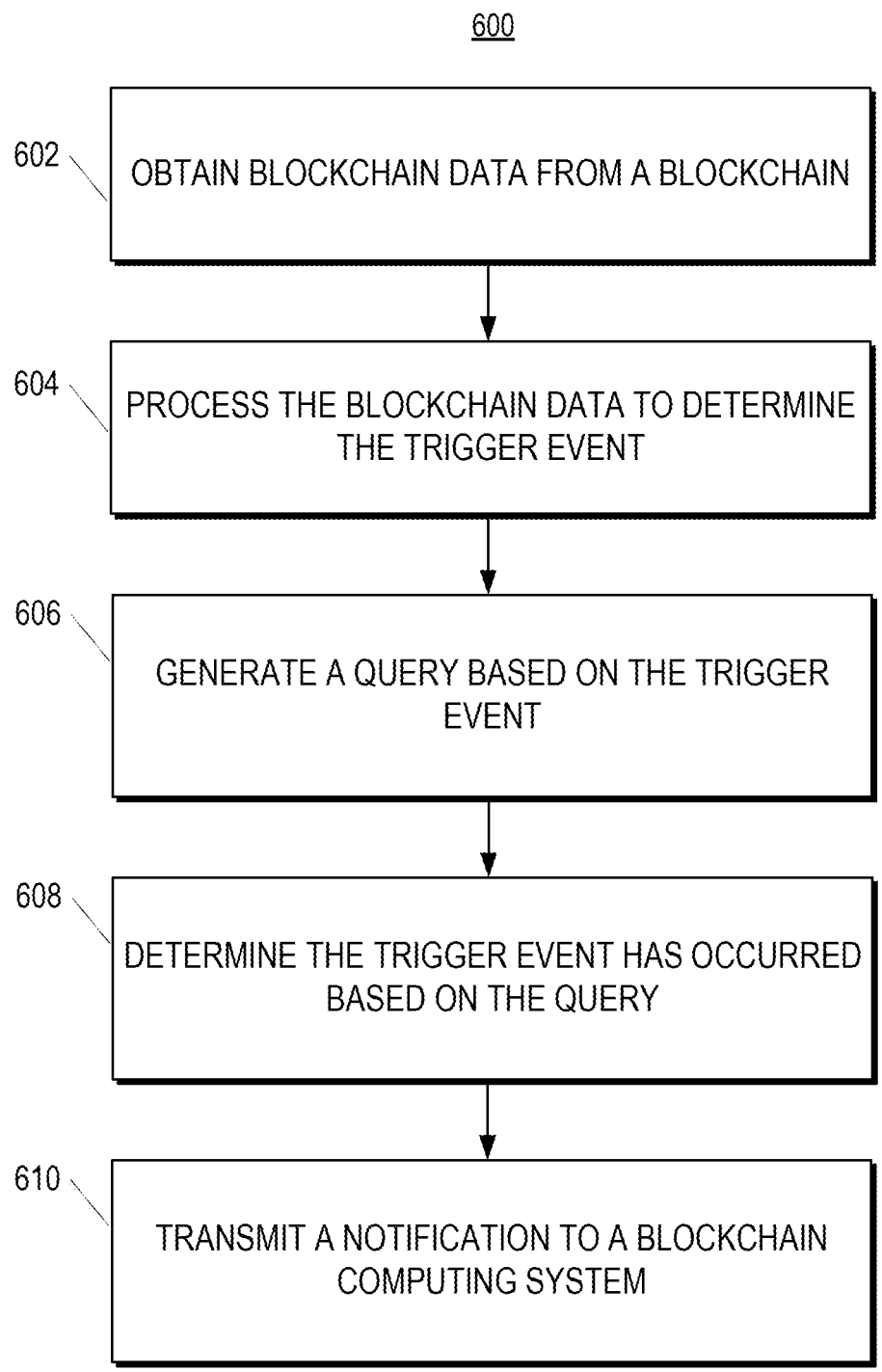
FIG. 6 depicts a flow chart diagram of an example method to perform trigger event determination according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain blockchain data from a blockchain. The blockchain data can be descriptive of a smart contract. In some implementations, the blockchain data can be obtained via a blockchain node. The smart contract can be associated with a trigger event and a resulting action. In some implementations, the resulting action can include providing a payload to a particular user. The payload can include a non-fungible token (e.g., a non-fungible token associated with a digital resource) and/or cryptocurrency. The resulting action may include implementing an application programming interface to perform a particular interaction (e.g., an update action, a transaction action, and/or message interaction). The trigger event may include a particular outcome of a sports event (e.g., a particular team winning, a particular player stat line, a particular play, and/or a particular point total). Alternatively and/or additionally, the trigger event may include a particular weather event occurring (e.g., rain occurring, a temperature high, a temperature low, a storm occurrence, and/or type of precipitation). In some implementations, the trigger event can include a particular location-based event occurring (e.g., a traffic event, a population event, a voting result event, an employment event, law passing event, and/or a local social event). The trigger event may include a query threshold being met. For example, the threshold may be a total volume of queries, a total volume of queries in a given time period, a location-based time volume, and/or a particular user query volume.

At 604, the computing system can process the blockchain data to determine the trigger event. The trigger event can be associated with one or more particular knowledge graphs (e.g., a knowledge graph associated with one or more entities (e.g., objects, people, events, tasks, situations, and/or concepts)) of a plurality of knowledge graphs. In some implementations, the one or more particular knowledge graphs can include a sports knowledge graph associated with a particular sport. The sports event may be associated with the particular sport. Alternatively and/or additionally, the one or more particular knowledge graphs can include a weather knowledge graph associated with a particular weather type. The one or more particular knowledge graphs can include a location knowledge graph associated with a particular location. Determining the trigger event can include identifying a subset of the blockchain data associated with a smart contract. The subset of the blockchain data associated with the smart contract can be processed to identify the trigger event data and the resulting action data. The trigger event data can then be processed by one or more machine-learned models to determine a semantic intent of the trigger event data. The trigger event may be an if clause associated with a smart contract. The resulting action can be a then clause associated with the smart contract. The structure of the data may be utilized to determine the trigger event data.

At 606, the computing system can generate a query based on the trigger event. The query can be associated with one or more particular knowledge graphs. The query can include one or more terms associated with the one or more particular knowledge graphs. Additionally and/or alternatively, the query can include one or more terms associated with the semantic intent of the trigger event. The query can include text data, image data, latent encoding data, audio data, and/or video data. The query may be generated based on a deterministic function and/or based on heuristics. Alternatively and/or additionally, the query may be generated with one or more machine-learned models. The one or more machine-learned models can include a natural language processing model (e.g., a large pre-trained language model), a segmentation model, an augmentation model, an image processing model, an audio processing model, a video processing model, and/or a latent encoding processing model. In some implementations, the query generation can include determining one or more labels associated with a trigger event and utilizing the one or more labels.

At 608, the computing system can determine the trigger event has occurred based on the query. In some implementations, the query can be provided to a search engine recursively at a predetermined interval. Alternatively and/or additionally, the interval may be machine-learned and/or may fluctuate based on one or more variables. In some implementations, the query may be utilized to search a database. The database can be determined based on the knowledge graph, may be pre-associated with the trigger event, may be determined based on the determined semantic intent, and/or may be a database of an authoritative source associated with a particular topic.

In some implementations, determining the trigger event has occurred based on the query can include providing the query to a search engine, obtaining search result data from the search engine, and determining the trigger event has occurred based on the search result data. The search result data may be processed to determine the search result data is descriptive of a particular outcome. The particular outcome can be processed to determine that the particular outcome is the trigger event. In some implementations, the search result data can be processed to determine a confidence level of the particular outcome determination. The search result data can be descriptive of information obtained from a plurality of sources. The respective information for particular sources may be weighted differently based on relevance to the topic, ranking of the search results, and/or based on a determined trustworthiness of the source.

Alternatively and/or additionally, determining the trigger event has occurred based on the query can include determining a trending topic is associated with the query and determining the trending topic is descriptive of the trigger event occurring. The trending topic can be associated with a disaster topic (e.g., a hurricane or wildfire), a media content item topic (e.g., a movie, a song, an album, an image, and/or a GIF), a stock topic, a sports team topic, and/or a particular entity topic.

At 610, the computing system can transmit a notification to a blockchain computing system. The notification may be generated based on the trigger event being determined. The blockchain computing system can be associated with the blockchain. In some implementations, the notification can be descriptive of the trigger event occurring. The notification may instruct the blockchain computing system to cause the resulting action to occur. In some implementations, the notification can be transmitted to the blockchain computing system via an application programming interface. The notification can be associated with one or more keys for validating the oracle system with the blockchain. The notification can include one or more lines of executable code, proof of work, a hash function, and/or evidence data.

Figure 7:
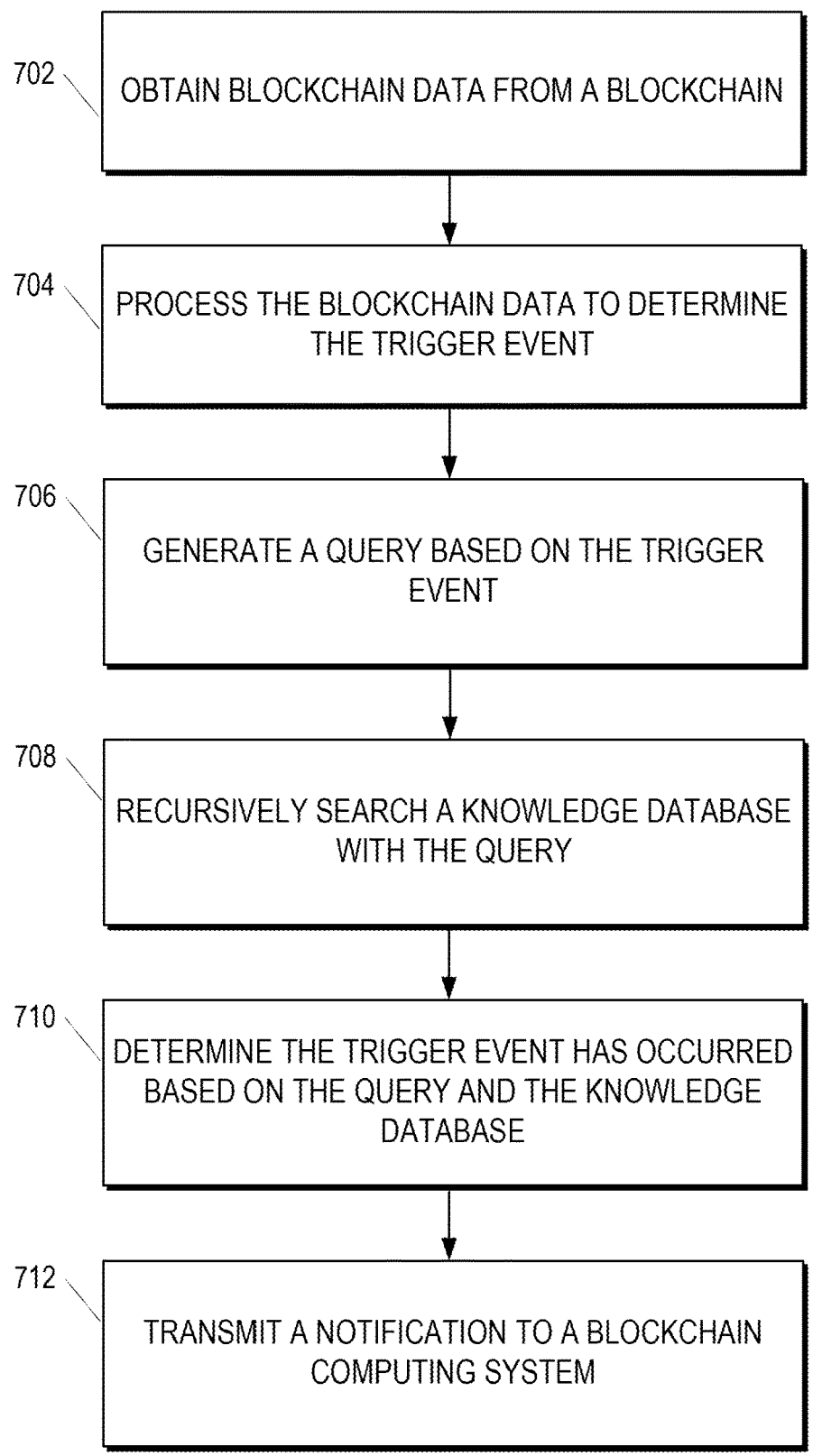
FIG. 7 depicts a flow chart diagram of an example method to perform trigger event determination according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain blockchain data from a blockchain. The blockchain data can be descriptive of a smart contract. In some implementations, the smart contract can be associated with a trigger event and a resulting action. The smart contract can include causing the resulting action to be performed in response to the trigger event being determined to occur. The smart contract can be descriptive of an if-then function. The if clause can be the trigger event, and the resulting action can be the then clause. The trigger event can include an outcome of an event. The resulting action can include a transfer of a digital resource and/or cryptocurrency. In some implementations, the resulting action can include causing an application programming interface to interact with a particular web platform. Alternatively and/or additionally, the resulting action can include generating an additional smart contract and embedding the smart contract to the blockchain.

At 704, the computing system can process the blockchain data to determine the trigger event. Determining the trigger event can include determining the subset of the blockchain data includes data associated with a smart contract. The determination may be based on one or more standards and/or one or more protocols for smart contracts. In some implementations, the determination may be based on a data structure. Additionally and/or alternatively, the blockchain data can be decrypted, processed to generate a plain English translation of the data, and the plain English translation can be processed by a natural language processing model to identify the trigger event.

At 706, the computing system can generate a query based on the trigger event. The query can be generated based on identifying one or more key words in a decrypted trigger event. The one or more keywords can then be utilized in the query. In some implementations, one or more labels can be determined based on the one or more key words, and the one or more labels can be utilized to generate the query.

At 708, the computing system can recursively search a knowledge database with the query. The recursive searching can occur at equal intervals, fluctuating intervals, and/or at a hybrid set of intervals such that equal intervals may be complemented by an additional search instance. The knowledge database can be associated with one or more sources. The one or more sources can be topic-specific authoritative sources and may have varying levels of authority.

In some implementations, the computing system can determine the trigger event is associated with a particular topic. The knowledge database can include data associated with a particular topic. The knowledge database can be determined based on the one or more particular knowledge graphs associated with the trigger event.

Additionally and/or alternatively, recursively searching the knowledge database with the query can generate a plurality of search result datasets. Each search result dataset may be associated with a different respective instance of a search. In some implementations, the computing system can determine the trigger event has occurred based on one or more search result datasets of the plurality of search result datasets.

At 710, the computing system can determine the trigger event has occurred based on the query and the knowledge database. The determination can include obtaining search result data associated with the recursive searching of the knowledge database. The search result data can be processed to determine if the search result data is descriptive of the trigger event occurring.

At 712, the computing system can transmit a notification to a blockchain computing system. The blockchain computing system can be associated with the blockchain. In some implementations, the notification can be descriptive of the trigger event occurring. The notification can instruct the blockchain computing system to cause the resulting action to occur.

Figure 8:
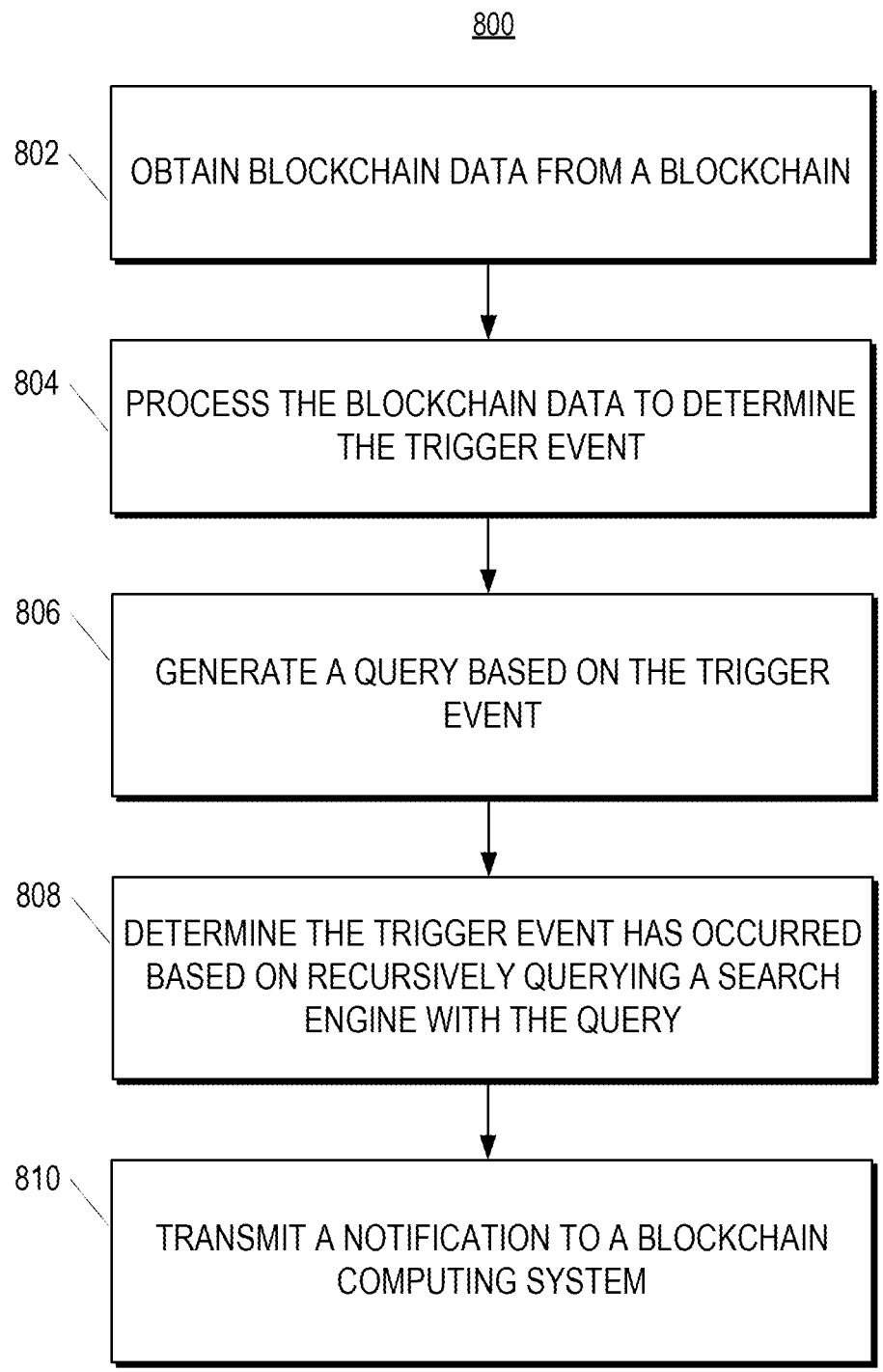
FIG. 8 depicts a flow chart diagram of an example method to perform trigger event determination according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain blockchain data from a blockchain. The blockchain data can be descriptive of a smart contract. In some implementations, the smart contract can be associated with a trigger event and a resulting action. The trigger event can include a particular blockchain action. The particular blockchain action can be associated with a particular user and a particular blockchain transaction. In some implementations, the resulting action can include transferring a digital resource to a particular user. The trigger event can include a transaction action associated with a particular non-fungible token. The resulting action can include a transaction action associated with a different non-fungible token.

At 804, the computing system can process the blockchain data to determine the trigger event. The trigger event can be associated with one or more entities. In some implementations, the one or more entities can include a sports team, a performer, a politician, an athlete, and/or a production company. The one or more entities may be determined by processing the blockchain data.

At 806, the computing system can generate a query based on the trigger event. The query can be associated with the one or more entities. The query may include one or more descriptors associated with the one or more entities. The query may include Boolean terms and/or one or more words associated with a particular event type.

In some implementations, generating the query can include processing the blockchain data with a machine-learned language model to determine a semantic intent (e.g., the meaning of the trigger event can be associated with an outcome of a sports event, a type of weather event, and/or a blockchain transaction) of the trigger event and generating the query based on the semantic intent.

At 808, the computing system can determine the trigger event has occurred based on recursively querying a search engine with the query. The search engine can be a general search engine, a topic specific search engine, a scholarly article search engine, an image search engine, and/or authoritative source search engine (e.g., a search engine that identifies authoritative sources and their respective content). The search engine may leverage one or more knowledge graphs.

At 810, the computing system can transmit a notification to the blockchain computing system. The blockchain computing system can be associated with the blockchain. The notification can be descriptive of the trigger event occurring. In some implementations, the notification can instruct the blockchain computing system to cause the resulting action to occur.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for trigger event determination, the system comprising:
    one or more processors; and
    one or more non-transitory computer-readable media that collectively store instructions that, when executed by the one or more processors, cause the computing system to perform operations, the operations comprising:
        obtaining blockchain data from a blockchain, wherein the blockchain data is descriptive of a smart contract, wherein the smart contract is associated with a trigger event and a resulting action;
        processing the blockchain data to determine the trigger event, wherein the trigger event is associated with one or more particular knowledge graphs of a plurality of knowledge graphs;
        generating a query based on the trigger event, wherein the query is associated with one or more particular knowledge graphs;
        determining the trigger event has occurred based on the query; and
        transmitting a notification to a blockchain computing system, wherein the blockchain computing system is associated with the blockchain, wherein the notification is descriptive of the trigger event occurring, and wherein the notification instructs the blockchain computing system to cause the resulting action to occur.

2. The system of claim 1, wherein determining the trigger event has occurred based on the query comprises:
    providing the query to a search engine;
    obtaining search result data from the search engine; and
    determining the trigger event has occurred based on the search result data.

3. The system of claim 1, wherein the query is provided to a search engine recursively at a predetermined interval.

4. The system of claim 1, wherein the resulting action comprises providing a payload to a particular user.

5. The system of claim 1, wherein the trigger event comprises a particular outcome of a sports event, wherein the one or more particular knowledge graphs comprise a sports knowledge graph associated with a particular sport, and wherein the sports event is associated with the particular sport.

6. The system of claim 1, wherein the trigger event comprises a particular weather event occurring, wherein the one or more particular knowledge graphs comprise a weather knowledge graph associated with a particular weather type.

7. The system of claim 1, wherein the trigger event comprises a particular location-based event occurring, wherein the one or more particular knowledge graphs comprise a location knowledge graph associated with a particular location.

8. The system of claim 1, wherein the trigger event comprises a query threshold being met.

9. The system of claim 1, wherein the notification is transmitted to the blockchain computing system via an application programming interface.

10. The system of claim 1, wherein the blockchain data is obtained via a blockchain node.

11. The system of claim 1, wherein determining the trigger event has occurred based on the query comprises:
    determining a trending topic is associated with the query; and
    determining the trending topic is descriptive of the trigger event occurring.

12. A computer-implemented method for trigger event determination, the method comprising:
    obtaining, by a computing system comprising one or more processors, blockchain data from a blockchain, wherein the blockchain data is descriptive of a smart contract, wherein the smart contract is associated with a trigger event and a resulting action;
    processing, by the computing system, the blockchain data to determine the trigger event;
    generating, by the computing system, a query based on the trigger event;
    recursively searching, by the computing system, a knowledge database with the query;
    determining, by the computing system, the trigger event has occurred based on the query and the knowledge database; and
    transmitting, by the computing system, a notification to a blockchain computing system, wherein the blockchain computing system is associated with the blockchain, wherein the notification is descriptive of the trigger event occurring, and wherein the notification instructs the blockchain computing system to cause the resulting action to occur.

13. The method of claim 12, wherein the smart contract comprises causing the resulting action to be performed in response to the trigger event being determined to occur.

14. The method of claim 12, further comprising:
    determining, by the computing system, the trigger event is associated with a particular topic; and
    wherein the knowledge database comprises data associated with a particular topic.

15. The method of claim 12, wherein recursively searching, by the computing system, the knowledge database with the query generates a plurality of search result datasets, wherein each search result dataset is associated with a different respective instance of a search; and
    wherein determining, by the computing system, the trigger event has occurred based on one or more search result datasets of the plurality of search result datasets.

16. One or more non-transitory computer-readable media that collectively store instructions that, when executed by one or more computing devices, cause the one or more computing devices to perform operations, the operations comprising:
  obtaining blockchain data from a blockchain, wherein the blockchain data is descriptive of a smart contract, wherein the smart contract is associated with a trigger event and a resulting action;
  processing the blockchain data to determine the trigger event, wherein the trigger event is associated with one or more entities;
  generating a query based on the trigger event, wherein the query is associated with the one or more entities;
  determining the trigger event has occurred based on recursively querying a search engine with the query; and
  transmitting a notification to a blockchain computing system, wherein the blockchain computing system is associated with the blockchain, wherein the notification is descriptive of the trigger event occurring, and wherein the notification instructs the blockchain computing system to cause the resulting action to occur.

17. The one or more non-transitory computer-readable media of claim 16, wherein the one or more entities comprise at least one of a sports team, a performer, a politician, an athlete, or a production company.

18. The one or more non-transitory computer-readable media of claim 16, wherein generating the query comprises:
  processing the blockchain data with a machine-learned language model to determine a semantic intent of the trigger event; and
  generating the query based on the semantic intent.

19. The one or more non-transitory computer-readable media of claim 16, wherein the trigger event comprises a particular blockchain action, wherein the particular blockchain action is associated with a particular user and a particular blockchain transaction.

20. The one or more non-transitory computer-readable media of claim 16, wherein the resulting action comprises transferring a digital resource to a particular user.

* * * * *